United States Patent
Iida et al.

(10) Patent No.: US 7,337,264 B2
(45) Date of Patent: *Feb. 26, 2008

(54) STORAGE CONTROL SYSTEM AND METHOD WHICH CONVERTS FILE LEVEL DATA INTO BLOCK LEVEL DATA WHICH IS STORED AT DIFFERENT DESTINATIONS BASED ON METADATA OF FILES BEING MANAGED

(75) Inventors: Junichi Iida, Odawara (JP); Hiroki Kanai, Odawara (JP); Keishi Tamura, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/582,324

(22) Filed: Oct. 18, 2006

(65) Prior Publication Data

US 2007/0033343 A1   Feb. 8, 2007

Related U.S. Application Data

(63) Continuation of application No. 10/842,490, filed on May 11, 2004, now Pat. No. 7,143,228.

(30) Foreign Application Priority Data

Mar. 5, 2004   (JP) .............................. 2004-061934

(51) Int. Cl.
*G06F 12/00* (2006.01)
*G06F 13/00* (2006.01)

(52) U.S. Cl. .......................... 711/4; 711/112; 711/113; 711/154; 709/217; 709/213; 710/74; 710/33

(58) Field of Classification Search ................ 709/213, 709/217; 710/74, 33; 711/4, 154, 112, 114, 711/111, 170, 203
See application file for complete search history.

(56) References Cited

U.S. PATENT DOCUMENTS 6,728,848 B2   4/2004   Tamura et al.

(Continued)

FOREIGN PATENT DOCUMENTS

EP   1357476   10/2003

(Continued)

OTHER PUBLICATIONS

G. Gilder, "The Case for Storage Virtualization Using Intelligent Routers", 2001 CROSSROADS Systems, pp. 1-12.

*Primary Examiner*—Hong Kim
(74) *Attorney, Agent, or Firm*—Mattingly, Stanger, Malur & Brundidge, P.C.

(57) ABSTRACT

A first storage control system comprises a CHN connected to a LAN CN. The CHN comprises a NAS processor and I/O processor. The I/O processor judges whether all or a portion of block level data is to be stored in either a first storage control system or a second storage control system, on the basis of an I/O allocation control data which indicates which of either the first storage control system or the second storage control system the block level data is to be stored in. On the basis of the result of this judgment, the I/O processor transfers the block level data from the NAS processor, to at least one of the DKA and the CHF connected to the second storage control system.

12 Claims, 24 Drawing Sheets

U.S. PATENT DOCUMENTS

| | | |
|---|---|---|
| 6,950,914 B2 | 9/2005 | Iwami et al. ................ 711/154 |
| 6,959,344 B2 | 10/2005 | Murotani et al. .............. 710/15 |
| 6,981,094 B2 | 12/2005 | Nonaka et al. ............. 711/114 |
| 6,990,553 B2 | 1/2006 | Nakayama et al. .......... 711/114 |
| 7,047,388 B2 | 5/2006 | Kaneko ....................... 711/170 |
| 7,051,121 B2 | 5/2006 | Ohno et al. ..................... 710/5 |
| 7,143,228 B2 * | 11/2006 | Iida et al. ....................... 711/4 |
| 2001/0001870 A1 | 5/2001 | Ofek et al. |
| 2002/0152339 A1 | 10/2002 | Yamamoto |
| 2002/0178143 A1 | 11/2002 | Fujimoto |
| 2003/0010567 A1 | 1/2003 | Gayetty |
| 2003/0221077 A1 | 11/2003 | Ohno et al. |
| 2004/0123026 A1 | 6/2004 | Kaneko |
| 2004/0139168 A1 | 7/2004 | Tanaka et al. ............... 709/213 |
| 2004/0172510 A1 | 9/2004 | Nagashima et al. ......... 711/162 |
| 2005/0071546 A1 | 3/2005 | Delaney et al. |
| 2005/0071559 A1 | 3/2005 | Tamura et al. |
| 2005/0114615 A1 | 5/2005 | Ogasawara et al. |
| 2005/0138287 A1 | 6/2005 | Ogasawara et al. ......... 711/114 |
| 2006/0075190 A1 | 4/2006 | Higaki et al. ................ 711/114 |

FOREIGN PATENT DOCUMENTS

| | | |
|---|---|---|
| JP | 10508967 | 9/1998 |
| WO | 0143368 | 6/2001 |

* cited by examiner

| VDEV # | EXTERNAL DEVICE INFORMATION ||||
|---|---|---|---|---|
| | SYSTEM IDENTIFICATION INFORMATION (INCLUDING, FOR EXAMPLE, VENDOR ID, DEVICE NAME, SERIAL NUMBER) | CAPACITY (KB) | DEVICE TYPE | PATH INFORMATION |
| | | | | WWN / LUN |
| 0 | DRFGTFNEIEK | 657,456 | DISK | 0xAABBCCDD / 0 |
| 1 | ADRFGTFNEIE | 89,854 | DISK | 0xAABBEEFF / 3 |
| 2 | GGRRFFDDERT | — | TAPE | 0x445566AAB / 5 |
| 3 | AABBCCDDEE | 5,544,223 | DISK | 0x77DE12345 / 6  ⎫<br>0x77DE12345 / 3  ⎬ ALTERNATIVE PATHS<br>0x377DE7890 / 5  ⎭ |

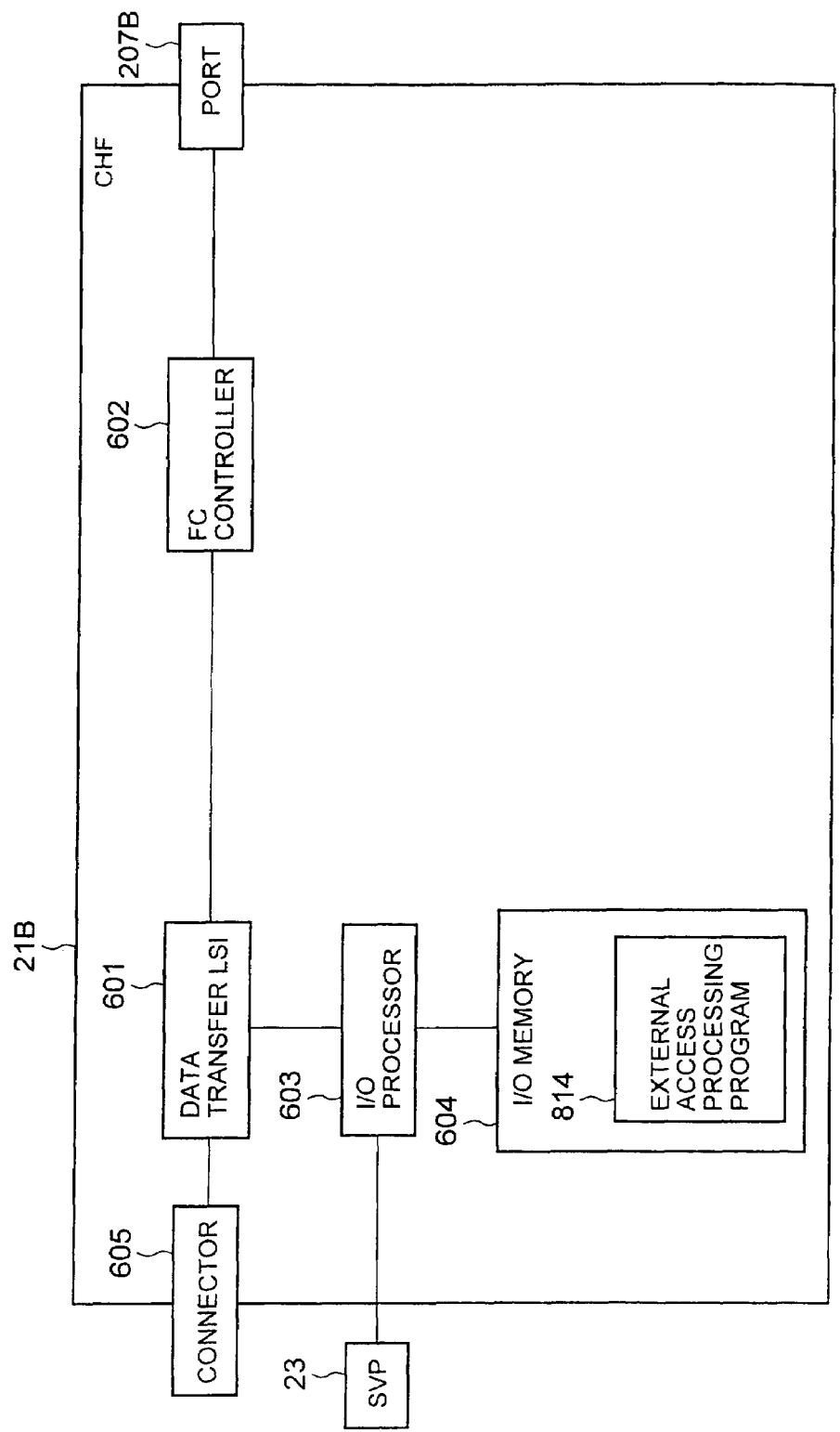

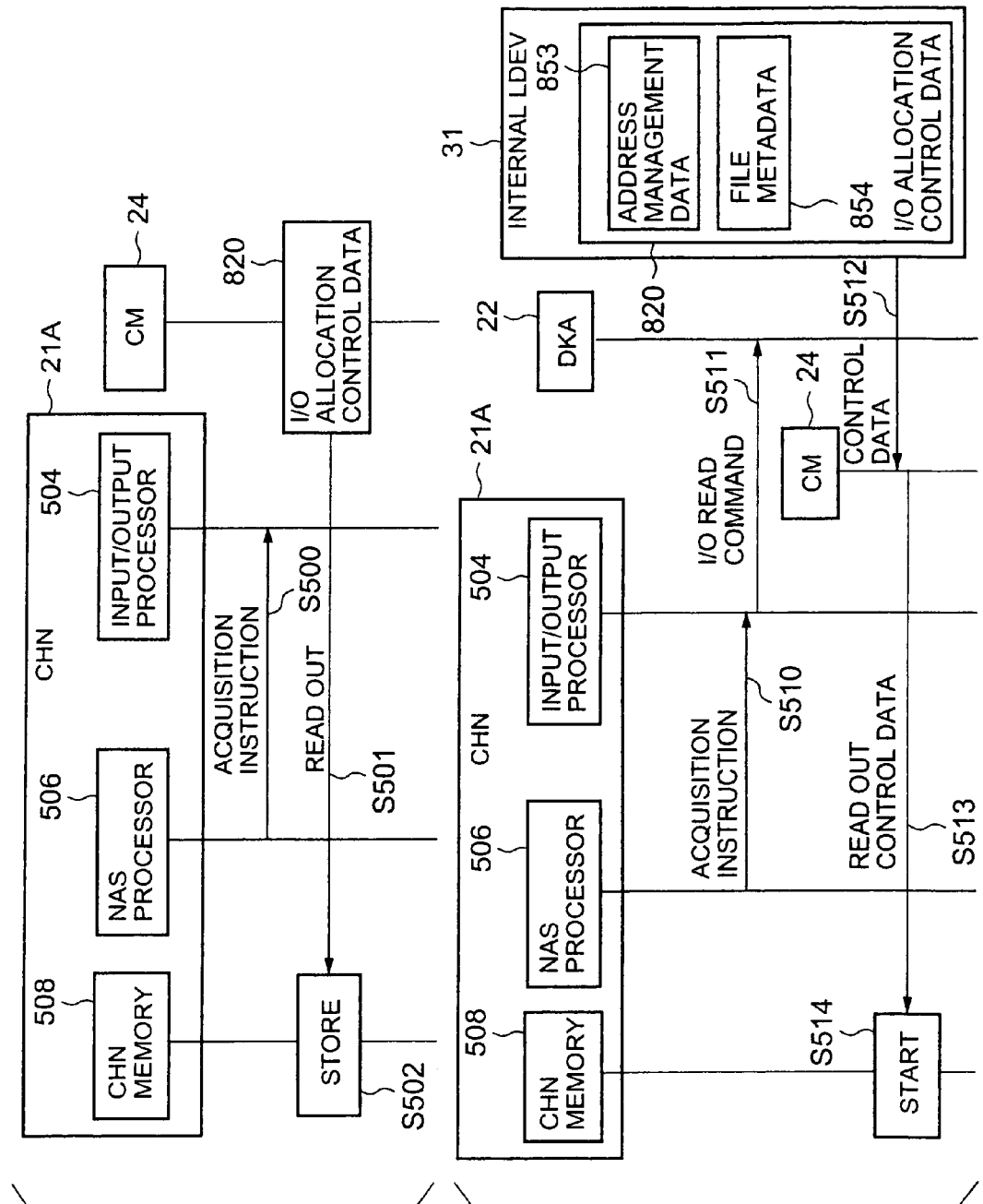

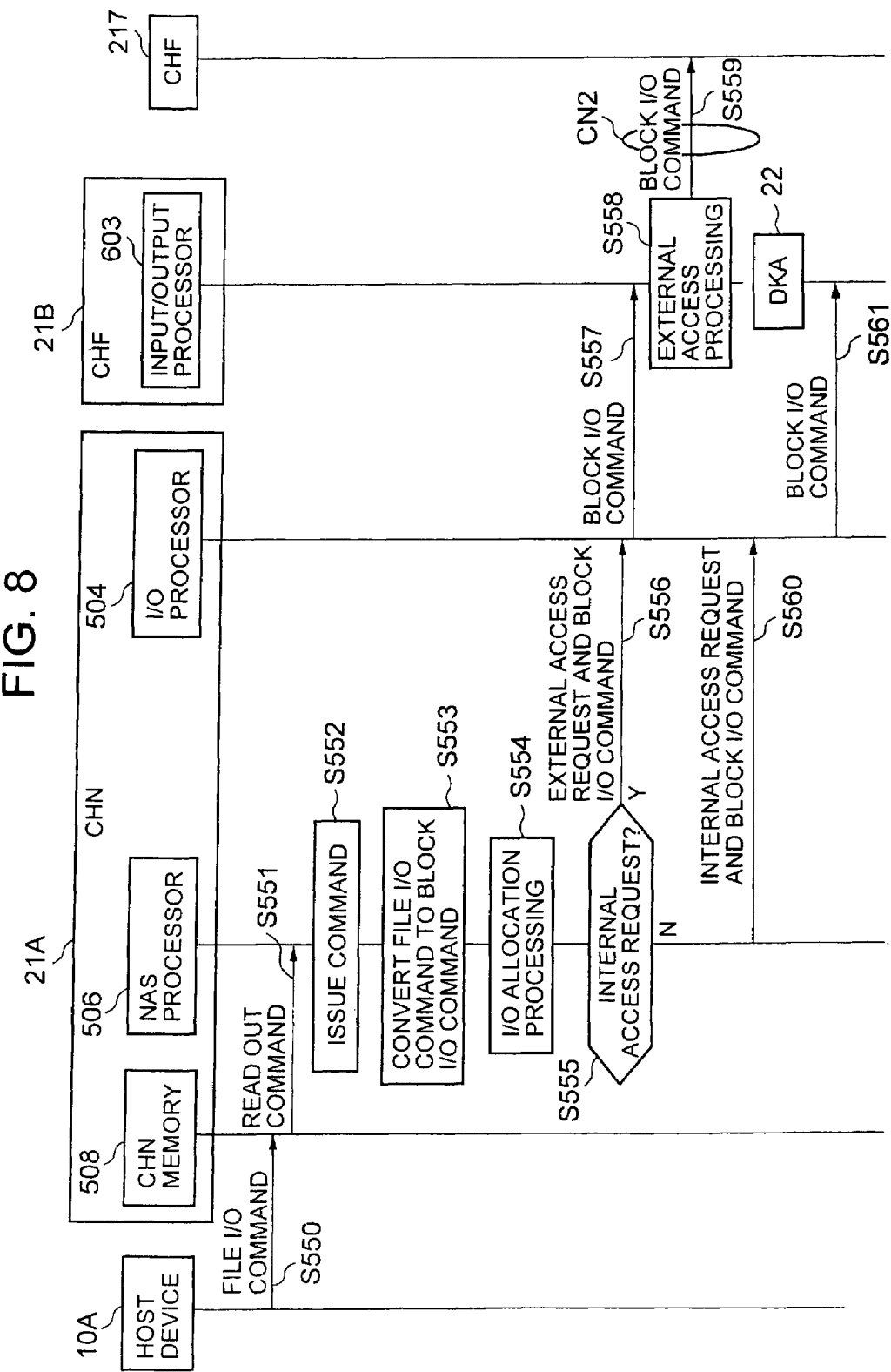

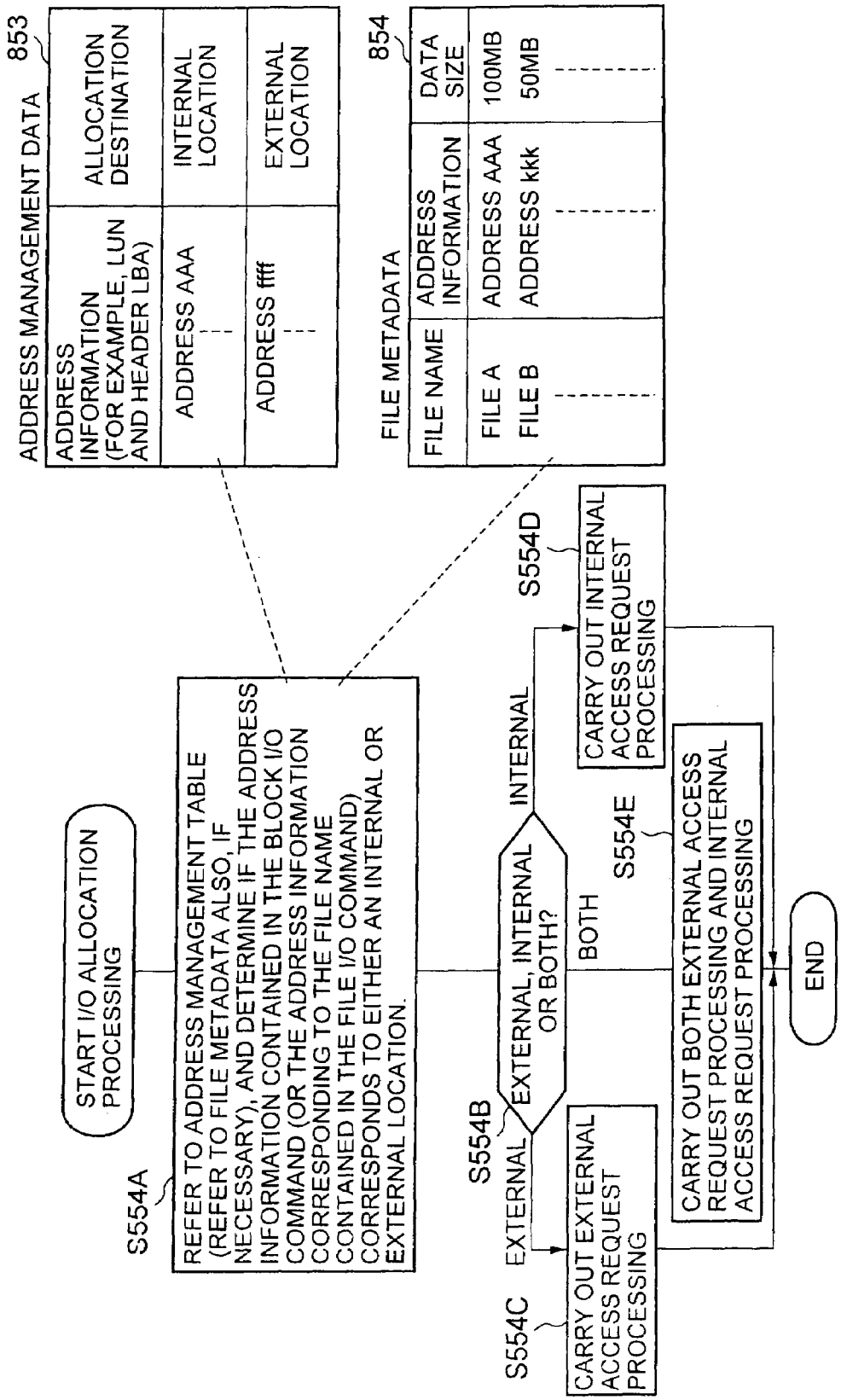

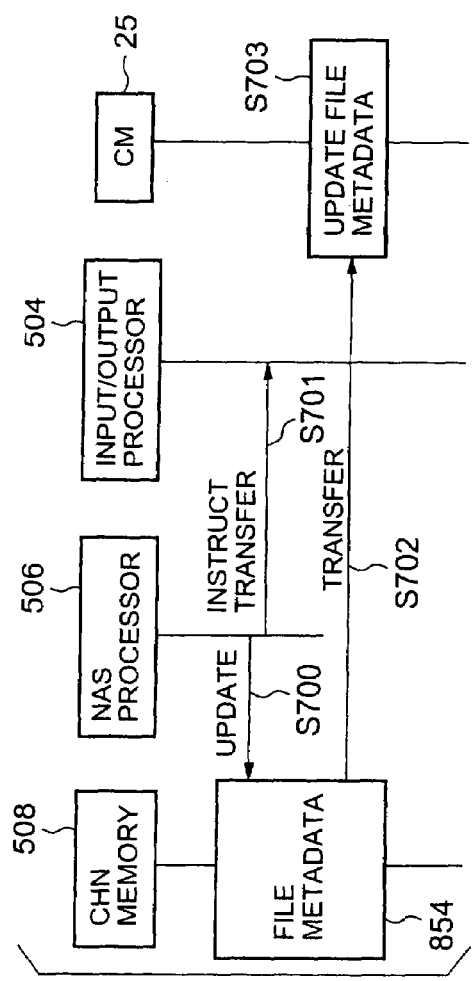
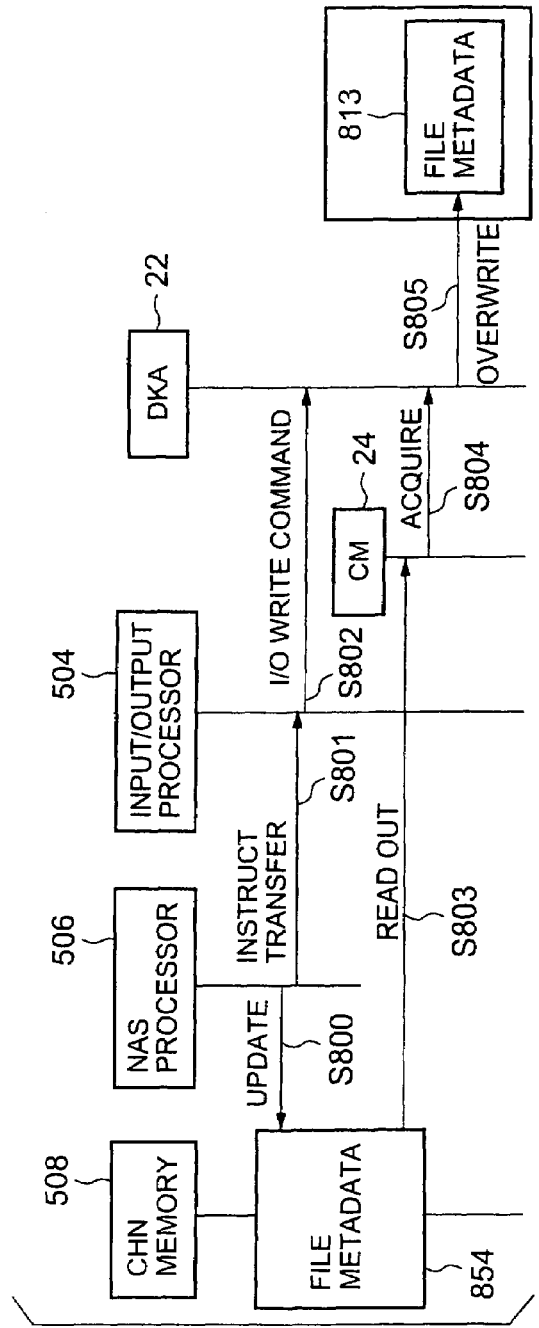
FIG. 10(A)
FIG. 10(B)

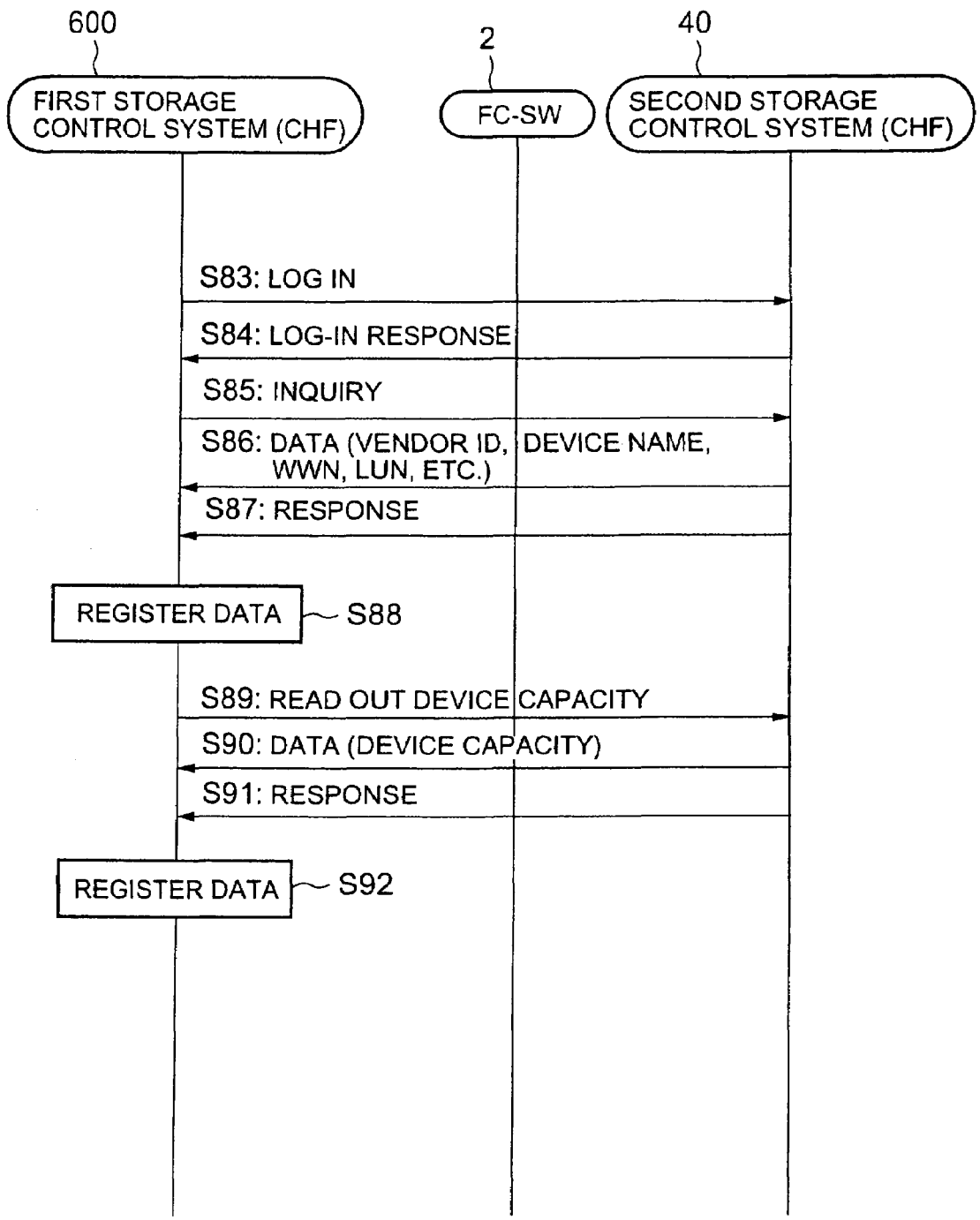

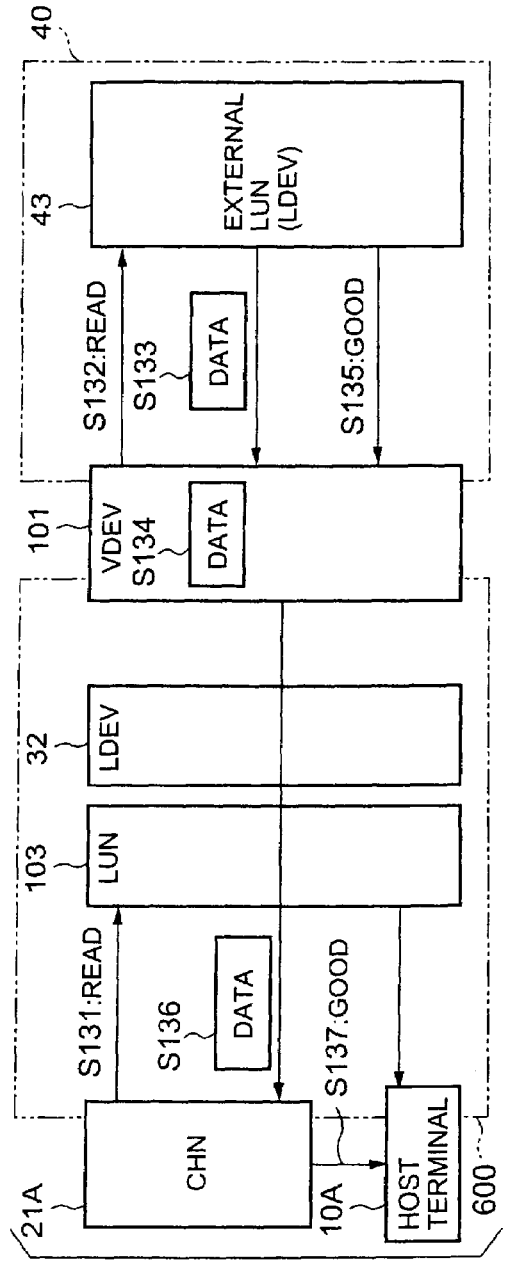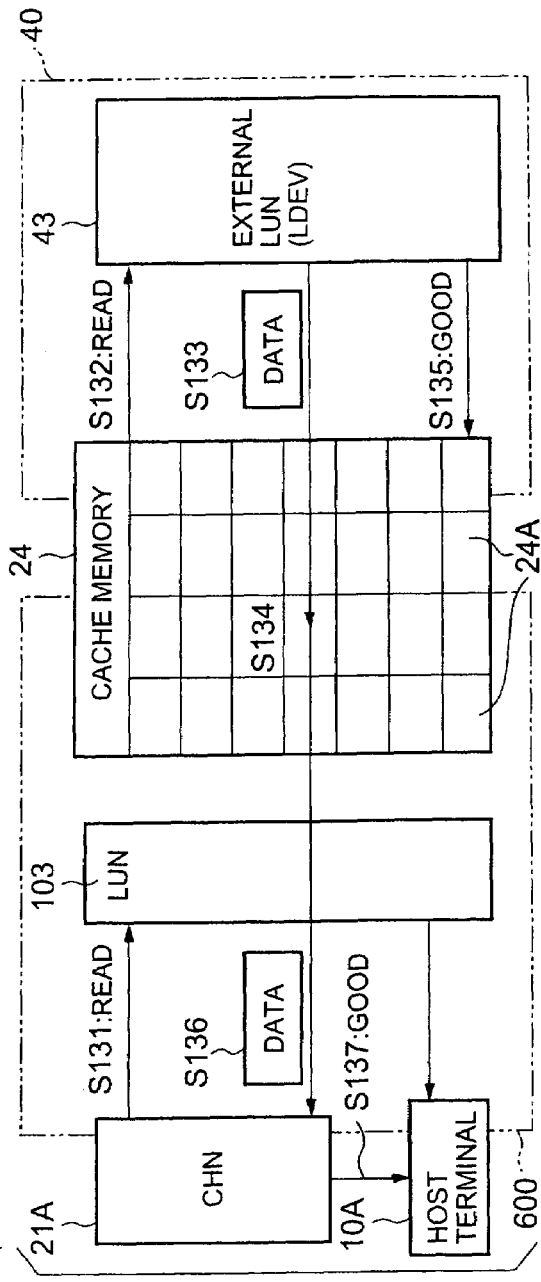
FIG. 14(A)
FIG. 14(B)

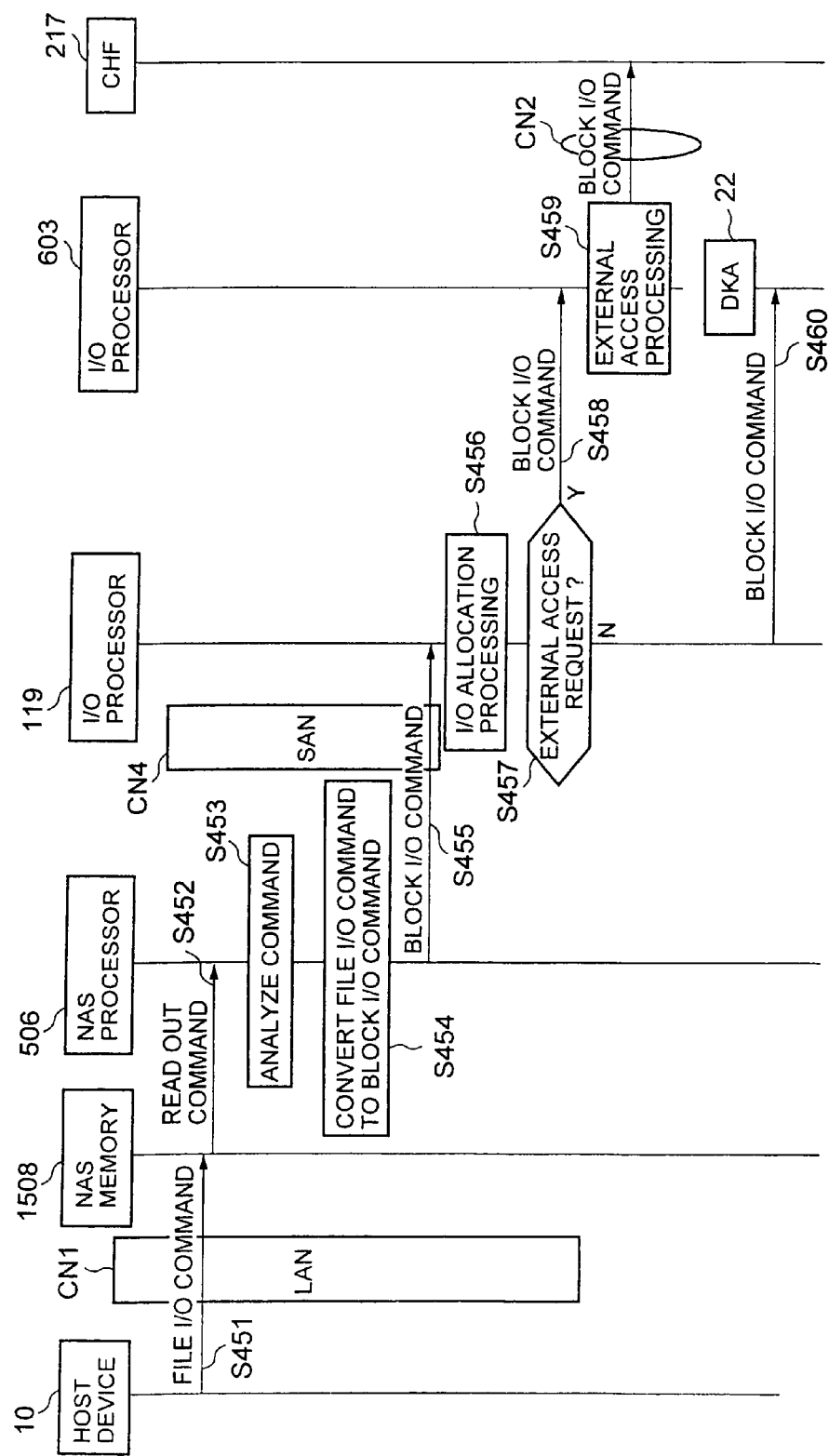

STORAGE CONTROL SYSTEM AND METHOD WHICH CONVERTS FILE LEVEL DATA INTO BLOCK LEVEL DATA WHICH IS STORED AT DIFFERENT DESTINATIONS BASED ON METADATA OF FILES BEING MANAGED

CROSS-REFERENCE TO RELATED APPLICATIONS

The present application is a continuation of application Ser. No. 10/842,490, filed May 11, 2004, now U.S. Pat. No. 7,143,228, which claims priority from Japanese Patent Application No. 2004-61934, filed on Mar. 5, 2004, the entire disclosure of which is incorporated herein by reference.

BACKGROUND OF THE INVENTION

1. Field of the Invention

The present invention relates to a storage control system and method.

2. Description of the Related Art

For example, in a database system for handling large volumes of data, such as that in a data centre, or the like, data is managed by using a storage control system constituted separately from the host computer. This storage control sub-system comprises, for example, a RAID (Redundant Array of Independent Inexpensive Disks) constituted by providing a plurality of disk type storage devices in an array fashion.

With the advance of the information-based society, the amount of data to be managed in databases is expanding all the time. Therefore, storage control systems having higher reliability and higher capacity are being demanded, and novel storage control systems have been developed in order to respond these market demands. As a method for introducing a new storage control system into a storage system, there is, for example, a method as disclosed in Japanese Laid-Open Patent No. (Hei) 10-508967, whereby the old storage control system is replaced completely by a new storage control system, and the storage system is constituted entirely by the new storage control system.

If transferring completely from an old storage control system to a new storage control system, it is possible to use the functions and characteristics of the new storage control system, but it is not possible to use the old storage control system effectively, and the costs of introducing the new system are also increased.

SUMMARY OF THE INVENTION

Therefore, it is an object of the present invention to provide a storage control system and method whereby an old storage control system can be used effectively.

Further objects of the present invention will become apparent from the following description.

The storage control system according to a first aspect of the present invention comprises: a plurality of storage devices for storing data (for example, disk type storage devices); a storage device control section for controlling the storage of received data in the plurality of storage devices (for example, a disk adapter); a connecting section connected to the storage device control section; a first channel control section (for example, a CHN as described hereinafter) connected to at least one of a local area network and a first storage network external to the storage control system and to the connecting section; a second channel control section (for example, a CHF as described hereinafter), for transferring data sent by the first channel control section via the connecting section, to an external storage control system via a second storage network external to the storage control system; a shared memory wherein first control information (for example, messages between processors) exchanged by the first channel control section, the second channel control section, and the storage device control section, is stored; and a cache memory for temporarily saving data exchanged between the first channel control section or the second channel control section and the storage device control section. The first channel control section comprises a second processor for receiving block level data from a first processor which converts file level data received via the local area network into the block level data. At least one of the first processor and the second processor judges whether all or a portion of the block level data is to be stored in either the storage control system or the external storage control system, on the basis of second control information indicating whether the data is to be stored in either the storage control system or the external storage control system. The second processor transfers the block level data received from the first processor, to at least one of the storage device control section and the second channel control section, on the basis of the result of the judgment.

This storage control system can be representing in more abstract terms as described below, for example.

A storage control system comprising: an allocation control data storage region for storing allocation control data; and a processor for processing at least one of file level data and block level data received via an external communications network; wherein the allocation control data contains address information indicating the storage destination of file identification information contained in block level data, or address information contained in block level data, and address location information associated with the address information; and the processor refers to the allocation control data, identifies the address location information corresponding to the address information indicating the storage destination of the file identification information contained in the received block level data, or the address information contained in the received block level data, and determines whether the block level data converted from the file level, or the received block level data, is to be stored in either a storage device belonging to the storage control system, or a storage device belonging to the second storage control system.

In this case, the first storage control system may be the aforementioned storage control system itself.

In the first embodiment of a storage control system according to the first aspect of the present invention, the first processor receives the file level data from a host computer, via the external local area network. The second processor transfers a portion of the block level data based on the file level data received from the host computer, to the second channel control section, so as to be stored in an external storage region belonging to the external storage control system, on the basis of the result of the judgment, and transfers the remaining portion of the block level data to the storage device control section, so as to be stored in an internal storage region belonging to the plurality of storage devices. According to this first embodiment, block level data based on data from the host computer is stored in a storage region combining the external storage region and the internal storage region.

In the second embodiment of a storage control system according to the first aspect of the present invention, the first channel control section sets a storage region combining an external storage region belonging to the external storage control system and an internal storage region belonging to the storage control system, as a logical unit, to be an access object of the host computer transmitting the file level data.

In the third embodiment of a storage control system according to the first aspect of the present invention, the storage control system further comprises a second control information storage region in which the second control information is stored. The first processor is provided in the first channel control section. At least one of the first processor and the second processor judges whether all or a portion of the block level data is to be stored in either the storage control system or the external storage control system, on the basis of the second control information stored in the second control information storage region. The second control information storage region is provided in a cache memory, for example.

In the fourth embodiment of a storage control system according to the first aspect of the present invention, a plurality of address information elements, and information indicating which of either the storage control system or the external storage control system each of the plurality of address information elements corresponds to, are recorded in the second control information. At least one of the first processor and the second processor refers to the second control information and judges which of either the storage control system or the external storage control system the address information contained in the block level data corresponds to.

In the fifth embodiment of a storage control system according to the first aspect of the present invention, the second control information contains file metadata relating to files managed by the first processor. The file metadata contains a plurality of file identification information elements and save destination address information elements corresponding respectively to the plurality of files. The first processor identifies the save destination address information corresponding to the file identification information contained in the received file level data, from the file metadata. At least one of the first processor and the second processor refers to the second control information and judges which of either the storage control system or the external storage control system the save destination address information thus identified corresponds to.

In the sixth embodiment of a storage control system according to the first aspect of the present invention, a virtual intermediate storage device provided between the internal storage region belonging to the storage control system and the storage devices. The virtual intermediate storage device associates the internal storage region with the external storage region belonging to the external storage control system.

The storage control method according to a second aspect of the present invention comprises: a converting step, a judging step, a first transfer step, a storing step and a second transfer step. In the converting step, a first processor converts file level data received via a local area network, into block level data. In the judging step, at least one of the first processor and a second processor belonging to a first channel control section connected to a communications network external to the storage control system judges whether all or a portion of the block level data is to be stored in either the storage control system or the external storage control system, on the basis of second control information indicating which of the storage control system and the external storage control system the data is to be stored in. In the first transfer step, the second processor transfers the block level data received from the first processor, to at least one of a storage device control section controlling the storage of data in the plurality of storage devices provided by the storage control system, and a second channel control section connected to the external storage control system via a storage network. In the storing step, the storage device control section stores received data in at least one of the plurality of storage devices, if data is received from the second processor. In the second transfer step, if data is received from the second processor, the second channel control section transfers the received data to the external storage control system.

In a first embodiment of a storage control method according to the second aspect of the present invention, the first processor receives the file level data from a host computer, via the external local area network. In the first transfer step, the second processor transfers a portion of the block level data based on the file level data received from the host computer, to the second channel control section, so as to be stored in an external storage region belonging to the external storage control system, on the basis of the result of the judgment, and transfers the remaining portion of the block level data to the storage device control section, so as to be stored in an internal storage region belonging to the plurality of storage devices.

In a second embodiment of a storage control method according to the second aspect of the present invention, a further step is provided in which the first channel control section sets a storage region combining the external storage region belonging to the external storage control system and an internal storage region belonging to the storage control system, as a logical unit, to be an access object of the host computer transmitting the file level data.

In a third embodiment of a storage control method according to the second aspect of the present invention, a further step is provided in which the second control information is stored in a second control information storage region. The first processor is provided in the first channel control section. In the judging step, at least one of the first processor and the second processor judges whether all or a portion of the block level data is to be stored in either the storage control system or the external storage control system, on the basis of the second control information stored in the second control information storage region.

In a fourth embodiment of a storage control method according to the second aspect of the present invention, a plurality of address information elements, and information indicating which of either the storage control system or the external storage control system each of the plurality of address information elements corresponds to, are recorded in the second control information. In the judging step, at least one of the first processor and the second processor refers to the second control information and judges which of either the storage control system or the external storage control system the address information contained in the block level data corresponds to.

In a fifth embodiment of a storage control method according to the third aspect of the present invention, the second control information contains file metadata relating to files managed by the first processor. The file metadata contains a plurality of file identification information elements and save destination address information elements corresponding respectively to the plurality of files. The storage control method further comprises a step in which the first processor identifies the save destination address information corresponding to the file identification information contained in the received file level data, from the file metadata. In the judging step, at least one of the first processor and the second processor refers to the second control information and judges which of either the storage control system or the external storage control system the save destination address information thus identified corresponds to.

In a sixth embodiment of a storage control method according to the is second aspect of the present invention, an internal storage region belonging to the storage control system is associated with the external storage region belonging to the external storage control system, via a virtual intermediate storage device provided between the internal storage region and the storage devices.

The storage control system according to a third aspect of the present invention is a storage control system which receives file level data via a local area network, comprising: a memory for storing received file level data, and a processor for converting the file level data stored in the memory, into block level data. The processor judges whether all or a portion of the block level data is to be stored in either a first storage control system located externally to the storage control system or a second storage control system located externally to the first storage control system, on the basis of second control information indicating which of either the storage control system or the external storage control system, the data is to be stored in, and transfers the result of the judgment and the block level data, to the first storage control system, via a storage network.

The storage control system according to the third aspect of the present invention may be, for example, a NAS (Network Area Storage) head, or it may be a NAS itself.

Moreover, at least one of the first storage control system and the second storage control system is a RAID system, for example. More specifically, for example, the first storage control system comprises: a plurality of storage devices for storing data; a storage control sub-system for transferring data received via at least one of a local area network and storage network, external to the first storage control system, to an external storage control system, via the same storage network as the storage network, or a separate storage network to same; and a memory for temporarily saving data received via at least one of the local area network and the storage network. The storage control sub-system comprises a separate processor for receiving block level data from the processor provided in the storage control system (for example, the NAS head). This separate processor transfers the block-level data received from the processor, to at least one of the storage device control section and the second channel control section, on the basis of the result of the judgment.

The storage control sub-system of the first storage control system may comprise, for example, the processor which receives file level data via a local area network and converts the file level data thus received into block level data. Moreover, in this case, for example, at least one of the processor and the separate processor judges whether all or a portion of the block level data is to be stored in either the first storage control system or the second storage control system, on the basis of control information indicating whether the data is to be stored in either the first storage control system or the second storage control system.

BRIEF DESCRIPTION OF THE DRAWINGS

FIG. 4 is an illustrative diagram showing an overview of a mapping table Tm;

FIG. 6 is a block diagram showing an example of the composition of the CHF 21B;

FIGS. 7(A) and 7(B) show the processing sequence relating to transmission and reception of an I/O allocation control data 820;

FIG. 8 shows the processing sequence implemented when a file I/O command received from the host device 10A is converted to a block I/O command and output;

FIG. 9 shows the example of the composition of the address management data 853 and file metadata 854 contained in the allocation control data 820, together with the detailed processing sequence of I/O allocation processing carried out on the basis of that allocation control data 820;

FIGS. 10(A) and 10(B) show the processing sequence implemented when the file metadata 854 is updated;

FIG. 11 shows a processing sequence carried out in a case where the CHF 21B of the first storage control system 600 creates a mapping table Tm;

FIGS. 14(A) and 14(B) are a conceptual diagram of a case where data is read out from an external LDEV;

FIG. 24 shows an example of a processing sequence according to the fourth modification example of the present embodiment, carried out in a case there a file I/O command output by the host device 10A is transferred as a block I/O command.

DESCRIPTION OF THE PREFERRED EMBODIMENTS

An overview of one embodiment of the present invention is now described.

In the present embodiment, the storage control system, such as a RAID system, or the like, is connected to a host terminal, by means of a first communications network (for example, a LAN) through which file-level data is exchanged. Moreover, the storage control system is connected to an external storage control system via a second communications network through which block-level data is exchanged (for example, a SAN (Storage Area Network)). Both the storage control system and the external storage control system are provided with logical storage devices for storing data (hereinafter, referred to as "LDEV", being an abbreviation for "Logical Device"). The LDEVs are provided in one or a plurality of disk type storage devices. The storage control system and the external storage control system are provided with a disk control section for controlling the storage of data in the disk type storage devices. The storage control system comprises a first and a second channel control section. The first channel control section comprises a first processor for receiving file-level data via the first communications network and converting same into block-level data, and a second processor for receiving block-level data from the first processor. The second channel control section transfers the block-level data received from the first channel control section, to the external storage control system, via the second communications network. At least one of the first and second processors judges whether to store all or a portion of the block-level data, in either the storage control system or the external storage control system, on the basis of I/O (Input/Output) allocation control data which indicates which of the storage control system or external storage control system the data is to be stored in. The second processor transfers the block-level data received from the first processor, to at least one of the disk control section and the second channel control section, on the basis of this judgment result.

Below, the present embodiment is described in detail with reference to the drawings.

Figure 1:
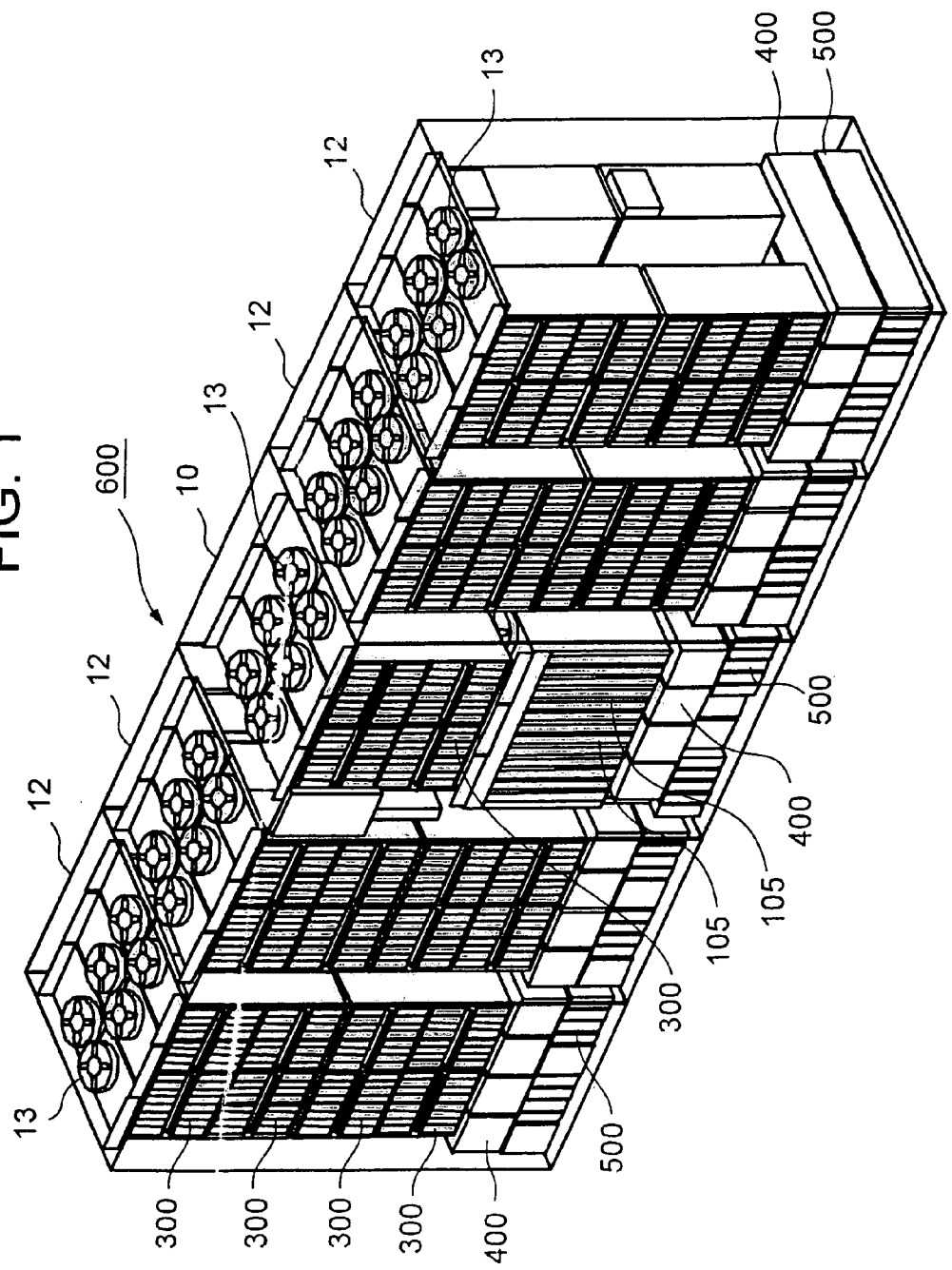
FIG. 1 shows a general view of the external appearance of a storage control system relating to one embodiment of the present invention.

FIG. 1 shows a general view of the external appearance of a storage control system relating to one embodiment of the present invention.

The storage control system 600 may be constituted by a base frame unit 10, and a plurality of add-on frame units 12 (although it may also be constituted by a base frame unit 11 only.).

The base frame unit 10 is the smallest composition unit of the storage control system 600. Provided respectively in a detachable manner in this base frame unit 10 are, for example, a plurality of disk type storage devices (for example, hard disk drives (HDD)) 300, a plurality of control packages (for example, channel control sections or display control sections) 105, a plurality of power units 400, and a plurality of parity units 500. Furthermore, a plurality of cooling fans 13 are also provided in the base frame unit 10.

Each add-on frame 12 is an optional storage control system 600, for example, a maximum of four add-on frames 12 can be connected to any one base frame unit 10. Furthermore, a plurality of cooling fans 13 are also provided in each add-on frame unit 12. A plurality of disk type storage devices 300, a plurality of power supply units 400, and a plurality of parity units 500 are provided in a respectively detachable fashion, in each of the add-on frame units 12, these respective elements each being controlled by means of a control function of a control package 105 provided in the base frame unit 10.

Figure 2:
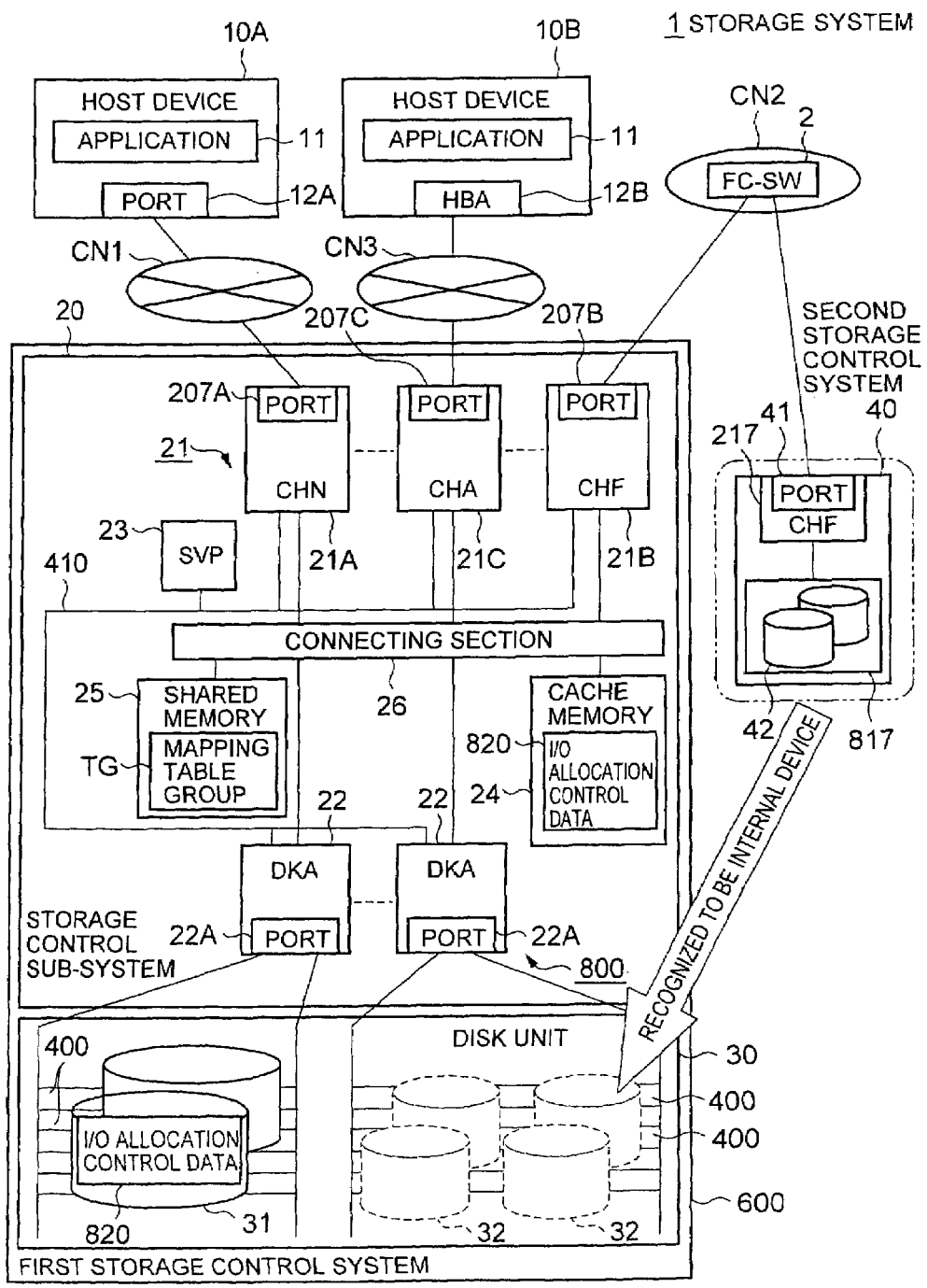
FIG. 2 is a block diagram showing the composition of a storage system relating to the present embodiment.

FIG. 2 is a block diagram showing the composition of a storage system relating to the present embodiment.

One or a plurality of host devices, for example, two host devices 10A, 10B are respective computer devices provided with information processing resources, such as a CPU (Central Processing Unit), memory, and the like, and they are constituted in the form of a personal computer, workstation, main frame computer, or the like. The host devices 10A, 10B respectively comprise, for example, information input devices (not illustrated), such as keyboard switches, pointing device, microphone, or the like, and information output devices (not illustrated), such as a monitor display, speakers, and the like, for example. Moreover, each of the host devices 10A, 10B is provided with, for example, an application program 11, such as database software using storage region provided by a first storage control system 600, and adapters 12A or 12B for accessing the first storage control system 600 via a communications network CN1.

The host device 10A is connected to the first storage control system 600 via a first communications network CN1. The communications network CN1 is a communications network for exchanging data at file level, and according to circumstances, a LAN, the Internet, a dedicated circuit, a public circuit, or the like, could be used for same (hereinafter, it is supposed that the first communications network is a "LAN"). Data communications via the LAN are conducted in accordance with a TCP/IP (Transmission Control Protocol/Internet Protocol), for example. The host device 10A requests data input and output in file units, to the first storage control system 600, by specifying a file name. The adapter 12A connected to the LAN CN1 is a network card (illustrated as "PORT") which is compatible with a LAN, for example.

The host device 10B is connected to the first storage control system 600 via a third communications network CN3. The third communications network CN3 is a communications network for exchanging data at block level, and is constituted by a SAN (Storage Area Network), for example, (hereinafter, it is supposed that the third communications network is a "SAN"). The host device 10B requests data input and output, to the first storage control system 600, in units of blocks which is the data management unit in the storage region provided by a plurality of disk storage device (for example, hard disk drives), in accordance with a fiber channel protocol. The adapter 12 connected to the SAN CN3 is a host bus adapter (illustrated as "HBA") for example.

In the diagrams, the host device 10A or 10B is connected only to the first storage control system 600 via the LAN CN1 or SAN CN3, but it is also possible for at least one of the host devices 10A and 10B to be connected to a second storage control system 40, by means of the second communications network CN2. The second communications network CN2 may be constituted, for example, by a SAN, LAN, Internet, dedicated circuit, public circuit, or the like, but in the present embodiment, it is supposed that it is constituted by a fiber channel switch (hereinafter, abbreviated to "FC-SW").

The first storage control system 600 is, for example, a RAID system comprising a plurality of disk storage device arranged in an array fashion. The first storage control system 600 is not limited to this, and it may also be constituted by an intelligent-type fiber channel switch providing high functionality. As described hereinafter, the first storage control system 600 may also not be provided with a local storage device that it controls directly itself, since the storage resources of the second storage control system 40 are provided to the host devices 10 as individual logical volumes (Logical Units).

The first storage control system 600 may be divided broadly into a storage control sub-system 20 and a disk unit 30. The storage control sub-system 20 comprises, for example, a channel control section 21, a disk control section 800, an SVP (Service Processor) 23, a cache memory 24, a shared memory 25 and a connecting section 26. The channel control section 21 comprises, for example, one or more channel adapters NAS (CHN) 21A, one or more channel adapters (CHA) 21C, and one or more fiber channel adapters (CHF) 21B. The disk control section 800 comprises a plurality of disk adapters (DKA) 22.

The CHN 21A conducts data communications with the host device 10A. The CHN 21A is provided with a communications port 207A for performing communications with the host device 1A. Moreover, the CHN 21A is constituted, for example, by a microcomputer system comprising a CPU, memory, and the like, and it interprets and executes various commands received from the host device 10A. The CHN 21A is assigned with a network address (for example, an IP address or WWN), for identifying that CHN 21A. The CHA 21N is able to receive an I/O command for a file unit from a host device 10, via the LAN CN1, (for example, a command containing a file name, and a command for reading or writing a file having that file name, hereinafter, referred to as a "file I/O command"), and behave as a NAS (Network Attached Storage) for processing that file I/O command. The composition and functions of the CHN 21A are described in detail hereinafter.

The CHA 21C conducts data communications with the host device 10B. The CHA 21C is provided with a communications port 207C for performing communications with the host device 10B. Moreover, the CHA 21C is constituted, for example, by a microcomputer system comprising a CPU, memory, and the like, and it interprets and executes various commands received from the host device 10B. The CHA 21C is assigned with a network address (for example, an IP address or WWN), for identifying that CHA 21C. The CHA 21C is able to receive I/O commands in block units (hereinafter, called "block I/O commands), from the host device 10B, via the SAN CN3, and to process those block I/O commands. A block unit is the management unit for data in the storage region in the disk storage device 400 described hereinafter.

The CHF 21B is connected via a communications port 207B to the FC-SW 2. The CHF 21B is constituted, for example, in the form of a microcomputer having a CPU, memory and the like, which is able to exchange data with the second storage control system 40, by means of the FC-SW 2. The composition and functions of the CHF 21B are described in detail hereinafter.

The respective DKAs 22 perform data exchange with the logical storage devices (hereinafter, LDEVs) 31, 32 in the disk unit 30. Each DKA 22 is provided with a communications port for connecting to the disk type storage device 400 which provides the LDEVs 31, 32. Moreover, each DKA 22 is constituted in the form of a microcomputer having a CPU, a memory, and the like. Each DKA 22 writes data received from the CHN 21A or the CHA 21C, to the LDEVs 31, 32, or transmits data read out from the LDEVs 31, 32, to the CHN 21A or CHA 21C. Each DKA 22 converts the logical address to a physical address, when it inputs data to or outputs data from the LDEVs 31, 32.

The cache memory (hereinafter, referred to also as "CM") 24 is, for example, a volatile or non-volatile memory, which temporarily stores data received from the host devices 10 and data read out from the LDEVs 31, 32. Moreover, the cache memory 24 is also capable of storing I/O allocation control data 820, described hereinafter, and instead of same, or in addition to same, the I/O allocation control data 820 may also be stored in the LDEV 31.

The shared memory (hereinafter, also referred to as "SM") 25 is, for example, a non-volatile shared memory, which stores control information relating to the data exchanged with the host devices (for example, information indicating which of the cache regions reserved on the CM 24, the data is to be stored in), and the like. Moreover, the shared memory 25, as well as being established as a work region (for example, a region in which messages exchanged between the CPUs of the CHN 21A, CHA 21C, CHF 21B and DKA 22 are stored temporarily), is also used to store various types of data, such as a mapping table group TG, and the like. It is also possible to use any one or a plurality of the LDEVs 31, 32 as a disk for caching.

The connecting section 26 provides a mutual connection between the CHN 21A, CHA 21C, CHF 21B, the respective DKAs 22, the cache memory 24 and the shared memory 25. The connecting section 26 may be constituted by a high-speed bus, such as an ultra-high-speed crossbar switch, or the like, which performs data transfer by means of a high-speed switching operation.

The disk unit 30 comprises a plurality of disk storage devices 400 arranged in an array fashion. For the disk storage devices 400, it is possible to use, for example, devices such a hard disk, flexible disk, magnetic tape, semiconductor memory, optical disk, or the like. The LDEVs 31, 32 are provided in a storage region of the disk storage device 400. The LDEVs 31 (or 32) is able to store I/O allocation control data, which is described hereinafter. The LDEV 32 indicated by the dotted line indicates a state where an LDEV 42 belonging to the second storage control system 40 is incorporated into the first storage control system 600. In other words, an LDEV situated externally from the viewpoint of the first storage control system 600, (hereinafter, called "external LDEV") 42 is provided to the host device 10 in the form of an internal LDEV 32 of the first storage control system 600.

The SVP 23 is an information processing terminals for maintaining or managing the first storage control system 600 (for example, a notebook-type personal computer). The SVP 23 is connected to the processors (for example, the CPU) in the CHN 21A, CHA 21C, CHF 21B and the respective DKAs 22, for example, by means of an internal LAN 410. The SVP 23 monitors the occurrence of faults in the first storage control system 600, displaying same on a display screen, and is used to instruct shut off processing, and the like, relating to the disk storage device 400.

The second storage control system 40 may have a similar composition of the first storage control system 600, or it may have a simpler composition than the first storage control system 600. For example, the second storage control system 40 comprises a CHF 217 having a communications port 41, and one or a plurality of disk storage devices 401. The LDEV 42 is provided in a storage region of the disk storage device 401. The second storage control system 40 is connected to the first storage control system 600 via the FC-SW 2, in such a manner that the LDEV of the second storage control system 40 (in other words, the external LDEV) 42 is treated as an internal LDEV 32 of the first storage control system 600.

At least one of the internal LDEV 31 (or the internal LDEV 32) and the CM 24 is able to store I/O allocation control data 820 used in controlling which of the first storage control system 600 or the second storage control system 40 block I/O data is allocated to (for example, at the address management data 853 of the address management data 853 and file metadata 854 described below). This I/O allocation control data 820 (for example, address management data 853) may, for example, be input by the SVP 23 to at least one of the CHN 21A, CHA 21C, CHF 21B and the respective DKAs 22, and this I/O allocation control data 820 may be stored in at least one of the CM 24 and the internal LDEV 31 (or internal LDEV 32).

Above, a general description of a storage system 1 relating to the present embodiment was given.

Figure 3:
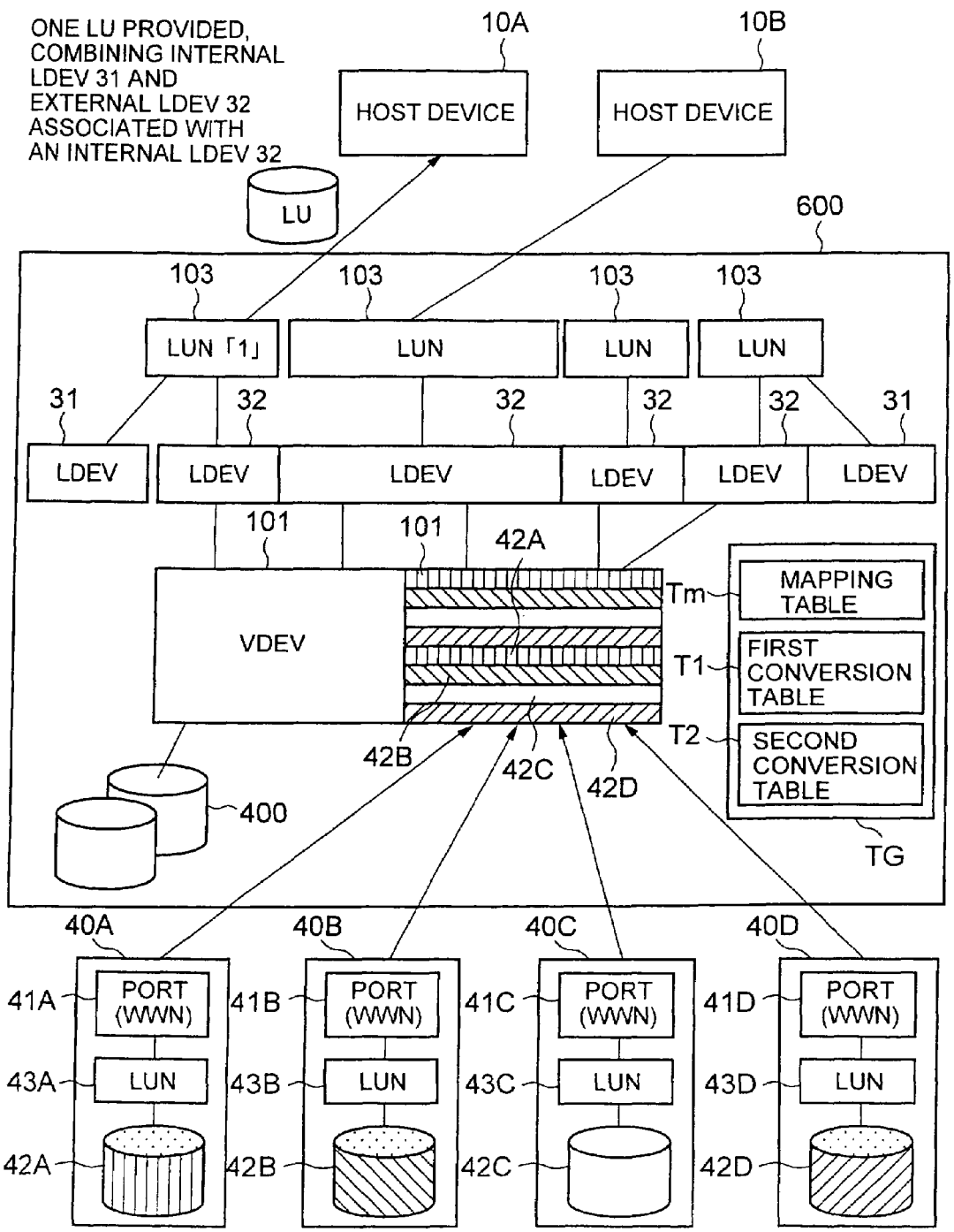
FIG. 3 is a schematic diagram showing the logical connection structure between the first storage control system 600 and the second storage control system 40.

FIG. 3 is a schematic view showing the logical connection structure between the first storage control system 600 and the second storage control system 40.

As shown in this diagram, the first storage control system 600 comprises three storage layers, consisting of VDEVs 101, LDEVs 31, and LUNs 103, in ascending order.

The VDEV 101s are virtual devices situated in the bottommost position of the logical storage layers. The VDEVs 101 are virtual representations of physical storage resources, and can be applied to a RAID structure. More specifically, it is possible to form a plurality of VDEVs 101 from a single disk storage device 400 ("slicing"), and it is also possible to form a single VDEV 101 from a plurality of disk storage devices 400 ("striping"). The VDEV 101 shown on the left-hand side in FIG. 3 is a virtual representation of a disk storage device 400 according to a prescribed RAID structure, for example.

On the other hand, the VDEV 101 shown on the right-hand side in FIG. 3 may be used as an internal LDEV 32 of the first storage control system 600, by mapping external LDEVs 42 provided by the disk storage device 401 of the second storage control system 40, to the VDEV 101, by means of the mapping table group TG (for example, the mapping table Tm in this group). In the example illustrated in this diagram, the VDEV 101 is constituted by striping of four external LDEVs 42A-42D existing respectively in four second storage control systems 40A-40D. Each of the external LDEVs 42A-42D can be accessed respectively and independently via respective communications ports 41A-41D, by identifying respective LUNs (Logical Unit Numbers) 43A-43D. Each communications port 41A-41D is assigned with a WWN (World Wide Name), which is unique identification information. Therefore, by specifying a combination of a WWN and LUN to the FC-SW 2, the first storage control system 600 is able to view an external LDEV 42 belonging to the LUN contained in that combination, via the FC-SW 2. If there are a plurality of LDEVs belonging to the LUN, then the plurality of LDEVs are provided to the host device 10, by the first storage control system 600, as a single logical storage device.

The mapping table group TG comprises a mapping table Tm, and a first conversion table T1 and a second table T2 prepared on the basis of this mapping table Tm. These respective tables Tm, T1 and T2 are described in detail below.

Internal LDEVs 32 are provided above the VDEVs 101. The internal LDEVs 32 are logical devices which are virtual representations of the virtual devices (VDEVs). It is possible to connect two internal LDEVs 32 to one VDEV 101, or to connect one internal LDEV 32 to a plurality of VDEVs 101. The internal LDEVs 32 can be accessed via respective LUNs 103. In this way, in the present embodiment, it is possible to use external LDEVs 42 as a single internal LDEV 32 of the first storage control system 600, by connecting the externals LDEVs 42 to an intermediate storage layer (VDEV 101 and internal LDEV 32) situated between the LUNs 103 and the external LDEVs 42.

As shown in the diagram, the first storage control system 600 comprises a mixture of internal LDEVs 32 which are connected to the external LDEVs 42, and internal LDEVs 31 which are not connected to external LDEVs 42. In the example illustrated in this diagram, an internal LDEV 31 and an internal LDEV 32 are associated with the LUN "1". Therefore, if the first storage control system 600 has received an LUN specification of "1" from the host device 10A, then it is able to provide a single logical unit (LU) comprising the storage region of the internal LDEV 32 and the storage region of the external LDEV 42 associated with that internal LDEV 32, as an accessible object, to the host device 10A.

FIG. 4 shows an overview of a mapping table Tm.

In the mapping table Tm, VDEV identification information for identifying the respective VDEVs 101 (hereinafter, referred to as "VDEV #") and information relating to the external LDEVs 42 (hereinafter, referred to as "external device information") are mutually associated. The external device information contains, for example, system identification information, the storage capacity of the external LDEV 42, information indicating the device type (for instance, whether it is a tape type device or disk type device, or the like), and information on the path to the external LDEV 42. The system identification information is, for example, information containing the vendor ID, model and serial number of the second storage control system 40. The path information may be constituted by comprising unique identification information (WWN), and a LUN 4, for each communications port 41. The system identification information and WWN, and the like, illustrated in FIG. 4 are values used for the sake of the description, and do not have any particular meaning. Moreover, the VDEV 101 having VDEV number "3" shown at the bottom of FIG. 4 is associated with three path information elements. More specifically, the external LDEV 42 mapped to this VDEV 101 (#3) has an internal alternative path structure comprising three paths, and it is mapped to the VDEV 101 (#3) by recognizing this alternative path structure. Since it is recognized that the same storage region can be accessed by passing via any one of these three paths, then even if a fault, or the like, occurs in any one or any two or the paths, it is still possible to access the desired data by means of the remaining path which is operating normally.

By adopting the mapping table Tm shown in FIG. 4, it is possible to map one or a plurality of external LDEVs 42 to one or more internal LDEVs 32 in the first storage control system 600.

Figure 5:
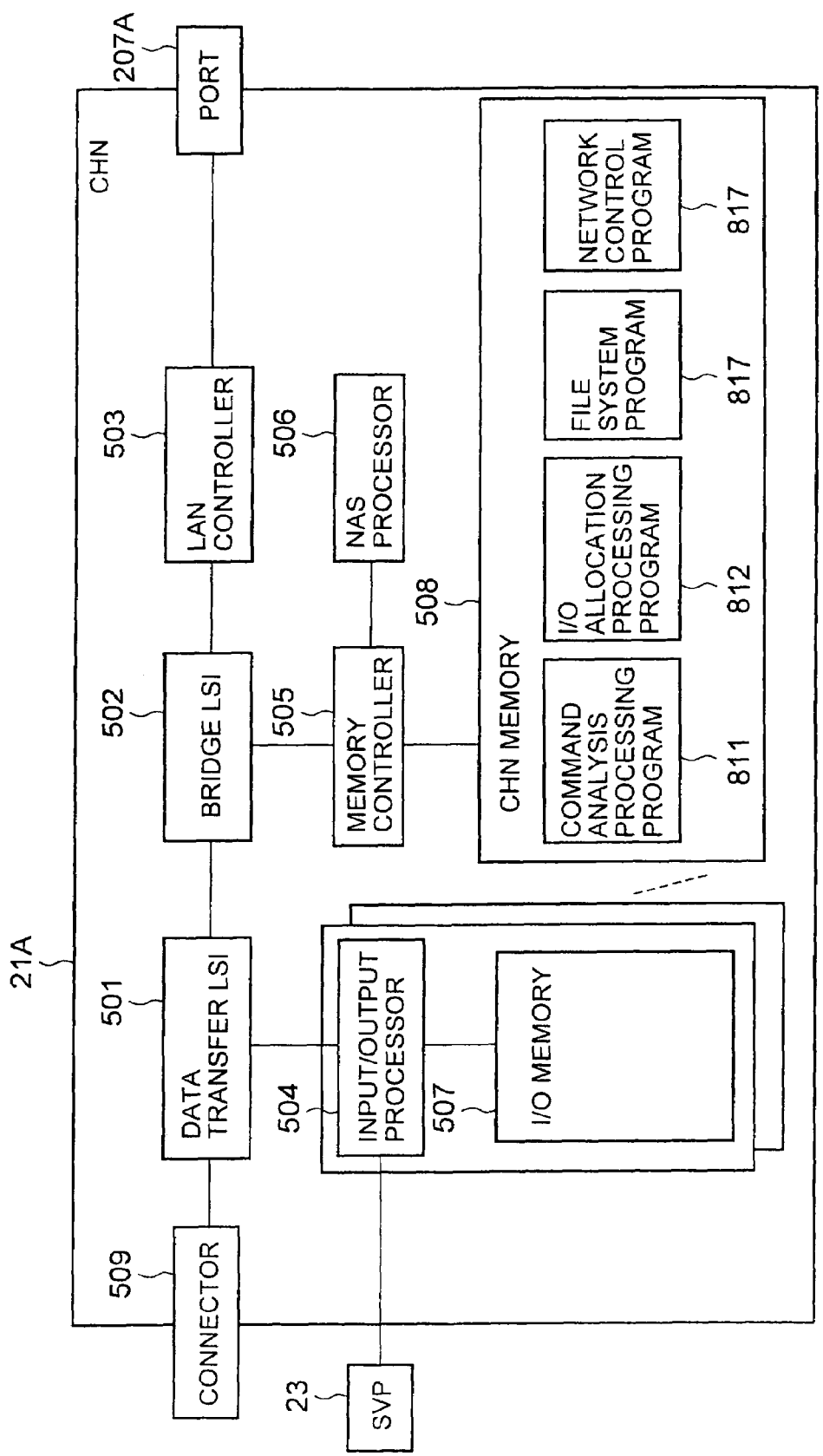
FIG. 5 is a block diagram showing an example of the composition of a CHN 21A.

FIG. 5 is a block diagram showing an example of the composition of the CHN 21A.

The CHN 21A comprises a communications port 207A, a LAN controller 503, a data transfer LSI 501, a bridge LSI 502, one or a plurality of input/output control sections 510 comprising an I/O processor 504 and an I/O memory 507, a memory controller 505, a NAS processor 506, a CHN memory 508 and a connector 509.

The LAN controller 503 controls the communications port 207A in accordance with instructions received from the NAS processor 506 via the memory controller 505 and the bridge LSI. The LAN controller 503 controls transmission and reception of file I/O commands in accordance with a TCP/IP protocol, for example.

The bridge LSI 502 is, for example, a LSI (Large-Scale Integrated circuit) for enabling mutual communications between the LAN controller 503, the memory controller 505 and the data transfer LSI 501.

The memory controller 505 is an LSI for controlling communications between the NAS processor 506 and the CHN memory 508. The memory controller 505 is connected to the NAS processor 506, the CHN memory 508 and the bridge LSI 502.

The CHN memory 508 is able to store programs for controlling the NAS processor 506, and data for exchange between the CM 24 and the host device 10A, and the like. The CHN memory 508 is also able to store, for example, a command analysis processing program 811, an I/O allocation processing program 812, a file system program 817 and a network control program 818. The command analysis processing program 811, I/O allocation processing program 812, file system program 817 and network control program 818 are able to cause prescribed processing to be executed in a computer, such as a CPU, (for example, the NAS processor 506), by being read into that computer. For example, the command analysis processing program 811 is a computer program for causing a computer to implement processing for analyzing a file I/O command received from the host device 10A. The I/O allocation processing program 812 is a computer program for causing a computer to implement I/O allocation processing, described hereinafter. The file system program 817 is, for example, a program for managing the association between the file name contained in a file I/O command and the address information of the location at which the file having that file name is stored (for example, the LUN and header logical block address), and converting the file I/O command to a block I/O command on the basis of this association. The network control program 818 is, for example, constituted by comprising two file system protocols, such as NFS (Network File System) and Samba. NFS accepts file I/O commands from a host device installed with a UNIX (registered tradename) operating system running NFS. Samba, on the other hand, accepts file I/O commands from a host terminal installed with a Windows (registered tradename) operating system running CIFS (Common Interface File System).

The NAS processor 506 is a CPU or a microprocessor. The NAS processor 506 is, for example, a processor of higher performance capability (for instance, higher computational processing speed), than the I/O processor 504. The NAS processor 506 is connected to the memory controller 505. The NAS processor 506 is able to read out the command analysis processing program 811, I/O allocation processing program 812, file system program 817, network control program 818, and the like, stored in the CHN memory 508, and execute processing in accordance with the computer programs thus read out. The NAS processor 506, for example, accepts file I/O commands from the host device 10A, by means of the network control program 818. Moreover, by means of the command analysis processing program 811, the NAS processor 506 analyses a file I/O command received from the host device 10A and stored in the CHN memory 508, to determine whether it is a read command or a write command. Furthermore, by means of the file system program 817, the NAS processor 506 converts the file I/O command received from the host device 10A and stored in the CHN memory 508, into a block I/O command, which it outputs to the I/O processor 504. Furthermore, by means of the I/O allocation processing program 812, the NAS processor judges whether the block I/O command is to be stored in an internal LDEV 31 or is to be stored in an external LDEV 42, and on the basis of this judgment, it is able to cause the I/O processor 504 to allocate that block I/O command to either an internal LDEV 31 or an external LDEV 42.

The I/O processor 504 is a CPU or microprocessor, which, by means of computer programs read out from the I/O memory 507, is able to perform control of processes, such as the exchange of data with the connecting section 26, the exchange of commands with the I/O processors in the CHA 21C or CHF 21B, and the interruption of the data communications between the NAS processor 506 and the connecting section 26, and the like. Moreover, the I/O processor 504 is able to communicate with the SVP 23.

The I/O memory 507 stores a computer program, and the like, for controlling the I/O processor 504.

The data transfer LSI 501 is an LSI, which is connected to a connector 509 in turn connected to the connecting section 26, and to the I/O processor 504 and the bridge LSI, and it controls the transfer of data.

The foregoing described the composition and functions of the CHN 21A. At least the I/O allocation processing program 812 of the aforementioned command analysis processing program 811 and I/O allocation processing program 812 is stored in the I/O memory 507, in such a manner that the I/O processor 504 can be caused to implement I/O allocation processing. This is described in further detail below, in a modification of the present embodiment.

FIG. 6 is a block diagram showing an example of the composition of the CHF 21B.

The CHF 21B comprises a communications port 207B, an FC controller 602, a data transfer LSI 601, an I/O processor 603, an I/O memory 604 and a connector 605.

The communications port 207B is a port for performing communications with an external device, such as the second storage control system 40.

The FC controller 602 is disposed inbetween the communications port 207B and the data transfer LSI 601. The FC controller 602 controls the transmission and reception of block I/O commands, in accordance with a fiber channel protocol, for example.

The I/O memory 604 is used to store programs for controlling the I/O processor 603. The I/O memory 604 stores, for example, an external access processing program 814. The external access processing program 814 is a computer program for causing the computer that reads in this program 814 to carry out processing for transferring a received block I/O command to the second storage control system 60.

The I/O processor 603 is a CPU or microprocessor. The I/O processor 603 is connected to the data transfer LSI 610, the I/O memory 604, and the SVP 23, and it read in various computer programs contained in the I/O memory 604 and controls the transmission and reception of data and commands.

The data transfer LSI 601 is an LSI, which is connected to a connector 605 in turn connected to the connecting section 26, and to the I/O processor 603 and FC controller 602, and it controls the transfer of data.

Below, the various processing sequences carried out in the present embodiment are described.

FIG. 7 shows a processing sequence relating to the transmission and reception of the I/O allocation control data 820.

The I/O allocation control data 820 can be stored in the CHN memory 508 inside the CHA 21A, by means of the processing sequence illustrated in FIG. 7(A) and FIG. 7(B), for example.

More specifically, as shown in FIG. 7(A), the NAS processor 506 outputs an instruction to the I/O processor 504, to acquire the I/O allocation control data 820 (step S500).

In response to this instruction, the I/O processor 504 reads in the I/O allocation control data 820 stored in the CM 24, to the CHN memory 508 (S501). Thereby, the I/O allocation control data 820 is stored in the CHN memory 508 (S502).

More specifically, as shown in FIG. 7(B), the NAS processor 506 outputs an instruction to the I/O processor 504, to acquire the I/O allocation control data 820 (step S510).

In response to this instruction, the I/O processor 504 outputs an I/O read command for reading out the I/O allocation control data 820, to a DKA 22 which is able to access the internal LDEV 31 in which the I/O allocation control data 820 is stored (S511).

The DKA 22 receiving the I/O read command reserves a cache region on the CM 24, acquires the I/O allocation control data 820 from the internal LDEV 31 storing the I/O allocation control data 820, and stores it in the cache region (S512).

The I/O processor 504 reads out the I/O allocation control data 820 to the CHN memory 508, from the reserved cache region (S513). Thereby, the I/O allocation control data 820 is stored in the CHN memory 508 (S514).

The NAS processor 506 is able to execute the I/O allocation processing described hereinafter, by using the I/O allocation control data 820 stored in the CHN memory 508. As shown in the diagram, for example, the I/O allocation control data 820 contains address management data 853 and file metadata 854. The address management data 853 and file metadata 854 are described hereinafter.

FIG. 8 shows the processing sequence implemented when a file I/O command received from the host device 10A is converted to a block I/O command and output.

The file I/O command output by the host device 10A is received by the CHN 21A and stored in the CHN memory 508 (S550). If the file I/O command is a file write command, then it will contain the data file to be written, the file name of that file, and the LUN, for example. If the file I/O command is a file read command, then it will contain the data file to be read out, the file name of that file, and the LUN, for example.

The NAS processor 506 reads out the file I/O command stored in the CHN memory 508 (S551), and in accordance with the file analysis processing program 811, it analyses whether that file I/O command is a file write command or a file read command (S552).

Moreover, the NAS processor 506 converts the file I/O command to a block I/O command, in accordance with the file system program 817 (S553). The NAS processor 506 performs I/O allocation processing, described hereinafter, on the basis of the address information contained in the converted block I/O command, and the I/O allocation control data 820 (S554).

As a result of the I/O allocation processing in S554, if external access request processing is to be carried out (Y at S555), then the NAS processor 506 outputs an external access request and the converted block I/O command, to the I/O processor 504 (S556). In this case, the I/O processor 504 transmits the received block I/O command to the I/O processor 603 in the CHF 21A, by means of the connecting section 26 (S557). The I/O processor 603 in the CHF 21A refers to the mapping table group TG, and performs external access processing, such as converting the internal LUN contained in the block I/O command received from the CHN 21A to an external LUN (S558), and transferring a block I/O command containing an external LUN to the CHF 217 of the second storage control system 40, via the second communications network CN 2 (S559).

On the other hand, if, as a result of the I/O allocation processing in S554, if internal access request processing is to be carried out (N at S555), then the NAS processor 506 outputs an internal access request and the converted block I/O command, to the I/O processor 504 (S560). In this case, the I/O processor 504 transmits the received block I/O command to the DKA 22, by means of the connecting section 26 (S561). Thereby, by means of the DKA 22, the data in the block I/O command is either written to a storage region in the internal LDEV 31 indicated by the address information contained in the block I/O command, or data is read out from a storage region in the internal LDEV 31 indicated by the address information contained in the block I/O command. If data has been read out, then the I/O processor 504 of the CHN 21A acquires the data from the DKA 22, via the CM 24, and transmits the data thus acquired to the host device 10A.

In the processing sequence shown in this diagram, the external access processing at S558 may be carried out by the I/O processor in the CHN 21A (or the CHA 21C), instead of the I/O processor of the CHF 21B. In this case, the I/O processor of the CHF 21B may transfer the received block I/O command to the second storage control system 40, only.

FIG. 9 shows the example of the composition of the address management data 853 and file metadata 854 contained in the allocation control data 820, together with the detailed processing sequence of I/O allocation processing carried out on the basis of that allocation control data 820.

As described above, the address management table 853 and the file metadata 854 are contained in the allocation control data 820.

The address management data 853 records a plurality of address information entries, and information indicating whether each of these address information entries correspond to internal or external storage. The address information may use, for example, a combination of a LUN and a header LBA (logical block address). Moreover, "internal" signifies a region contained within the first storage control system 600, and "external" signifies a region inside the second storage control system, which is external to the first storage control system 600.

The file metadata 854 records attribute information relating to each of the plurality of files managed by the file system program 818 of the NAS processor 806, for example, the file name and address information indicating the location at which the file having that file name is stored (for example, the LUN and header LBA), as well as the data size for that file. Although not shown in the drawings, the file metadata 854 may also contain other attribute information, such as the update timing, and the like. Moreover, the file metadata 854 may also record attribute information relating to a directory, rather than just files.

Below, the I/O allocation processing is described.

The I/O allocation processing program 812 read into the computer (for example, the NAS processor 506) refers to the address management data 853 and judges whether the address information contained in the converted block I/O command (in other words, the address information corresponding to the file name contained in the file I/O command)

corresponds to an internal or external location (S554A). Alternatively, the I/O allocation processing program 812 acquires the address information corresponding to the file name contained in the file I/O command, from the file metadata 854, and judges whether the acquired address information corresponds to an internal or external location, by referring to the address management data 853 (S554A).

If, as a result of the judgment in S554A, the I/O allocation processing program 812 identifies an external location (external at S554B), then it determines that an external access request is to be issued (S554C). In this case, the processing in S556 in FIG. 8 is carried out.

If, as a result of the judgment in S554A, the I/O allocation processing program 812 identifies an internal location (internal at S554B), then it determines that an internal access request is to be issued (S554D). In this case, the processing in S560 in FIG. 8 is carried out.

If, as a result of the judgment in S554A, the I/O allocation processing program 812 identifies both an external and an internal location (both at S554B), then it determines that both an external access request and an internal access request are to be issued (S554D). In this case, the processing in both S556 and S560 in FIG. 8 is carried out. A case where both are identified may be, for example, a case where the range of the write destination or read destination address contains both address information of an internal LDEV 31 which is not associated with an external LDEV 42, and address information of an internal LDEV 32 which is associated with an external LDEV 42. In a concrete example, this corresponds to a case where data is stored in the whole storage region having an LUN of "1" in FIG. 3.

In the sequence described above, I/O allocation processing is carried out.

The contents recorded in the file metadata 854 are updated appropriately when data is written to the internal LDEV 31 and internal LDEV 32 (in other words, the external LDEV 42), or data is deleted from the internal LDEV 31,32.

FIG. 10 shows the processing sequence carried out in a case where the file metadata 854 is updated.

The file metadata 854 can be updated by means of the processing sequence shown in FIG. 10(A) or FIG. 10(B).

In other words, as shown in FIG. 10(A), the NAS processor 506 updates the file metadata 854 read out to the CHN memory 508 (S700), whenever a prescribed event has occurred, for instance, whenever data has been written to the internal LDEVs 31, 32, or data has been erased from the internal LDEVs 31, 32.

Thereupon, at a prescribed timing (for example, immediately after S700), the NAS processor 506 outputs a transfer instruction to the I/O processor 504, indicating transfer of the updated file metadata 854 in the CHN memory 508, to the CM 24 (S701).

In response to this transfer instruction, the I/O processor 504 reads out the updated file metadata 854 in the CHN memory 508 and transfers it to the CM 24 (S702). Thereby, the file metadata stored in the CM 24 is updated by the updated file metadata 854 in the CHN memory 508.

Moreover, as shown in FIG. 10(B), the NAS processor 506 updates the file metadata 854 read out to the CHN memory 508, similarly to S700 (S800).

Thereupon, at a prescribed timing (for example, immediately after S800), the NAS processor 506 outputs a transfer instruction to the I/O processor 504, indicating transfer of the updated file metadata 854 in the CHN memory 508, to the internal LDEV 31 (S801).

In response to this transfer instruction, the I/O processor 504 reserves a cache region on the CM 24, outputs an I/O line command to a DKA 22 capable of accessing the internal LDEV 31 where the file metadata is stored (S802), and reads outs the updated file metadata 813 in the CHN memory 508 to the reserved cache region (S803).

The DKA 22 receiving the I/O line command acquires the update file metadata from the reserved cache region (S804), and writes the updated file metadata 854 thus acquired, over the file metadata in the internal LDEV 31 (S805).

Next, a case is described wherein the aforementioned mapping table Tm (see FIG. 4) is created by means of exchanging information between the CHF 21B of the first storage control system 600 (hereinafter, called first CHF 21B), and the CHF 217 of the second storage control system 40 (second CHF 217).

FIG. 11 shows a processing sequence carried out in a case where the CHF 21B of the first storage control system 600 creates a mapping table Tm.

Although not illustrated in the diagrams, for example, the CHF 21B issues an investigate command to the FC-SW 2, in response to which, it receives from the FC-SW 2, the log-in requirement information required for logging in to the second storage control system 40 connected to the FC-SW 2 (such as the WWN of the communications port 41 connected to the FC-SW 2, for instance). The CHF 21B registers the log in requirement information for each second storage control system 40 received from the FC-SW 2, in the I/O memory (in other words, a local memory) 604 or the SM 25.

If, for example, the first CHF 21B has received from the SVP 23 a request to associate a VDEV 101 with an external LDEV 42, then the log-in requirement information registered in the I/O memory 604 (or the SM 25) is used to log in to the second storage control system 40, via the initiator port (207B) of the CHF 21B (S83). The second CHF 217 returns a response to the log in operation from the first CHF 21B (S84), thereby completing log in.

Thereupon, the first CHF 21B transmits an inquiry command as specified by the SCSI (Small Computer System Interface) specifications, for example, to the second CHF 217 (S85). The inquiry command referred to here is used in order to clarify the type and composition of the device subject to the inquiry, and it allows the device issuing the inquiry command to assess the physical structure of the device subject to inquiry.

For example, the second CHF 217 having received an inquiry command obtains control system information relating to the second storage control system 40A, from the memory (not illustrated) in the second storage control system 40, transmits this control system information to the first CHF 21B (S86), and returns a prescribed response (S87). The control system information transmitted here contains, for example, the vendor ID, device name and serial number of the second storage control system 40, the WWN of the communications port 41A from which the inquiry command was received, the LUN belonging to that WWN, the LDEV number belonging to that LUN, and the type of disk providing that LDEV.

The first CHF 21B registers the control system information thus received (for example, system control information containing the vendor ID, device name and serial number of the second storage control system 40, the WWN, LUN and disk type), in a prescribed location of the mapping table Tm (for example, a location corresponding to the VDEV # specified by the client) (S88).

Next, the first CHF 21B transmits an enquiry relating to the storage capacity of the external LDEV 42 belonging to the LUN contained in the control system information thus received (for example, a read capacity command based on the SCSI protocol), to the second CHF 217 (S89). The second CHF 217 refers to the storage capacity information stored in the memory (not illustrated) inside the second storage control system 40, (for example, the total storage capacity of the one or more external LDEVs 42 belonging to the LUN), and transmits the storage capacity thus found (in other words, the storage capacity of the external LDEVs 42), back to the first CHF 21B (S90), and returns a response (S91). The first CHF 21B registers the received storage capacity in a prescribed location of the mapping table Tm (for example, a location corresponding to a VDEV# specified by the client) (S92).

By means of the processing described above, an association is created between a VDEV# and control system information and a storage capacity.

After the VDEV# has been mapped with the external system information (information including control system information and storage capacity), then if the host device 10A carries out data input or output, to or from the external LDEV 42, via the first storage control system 600, then address conversion, and the like, is carried by referring to the various tables in the mapping table group TG.

Figure 12A:
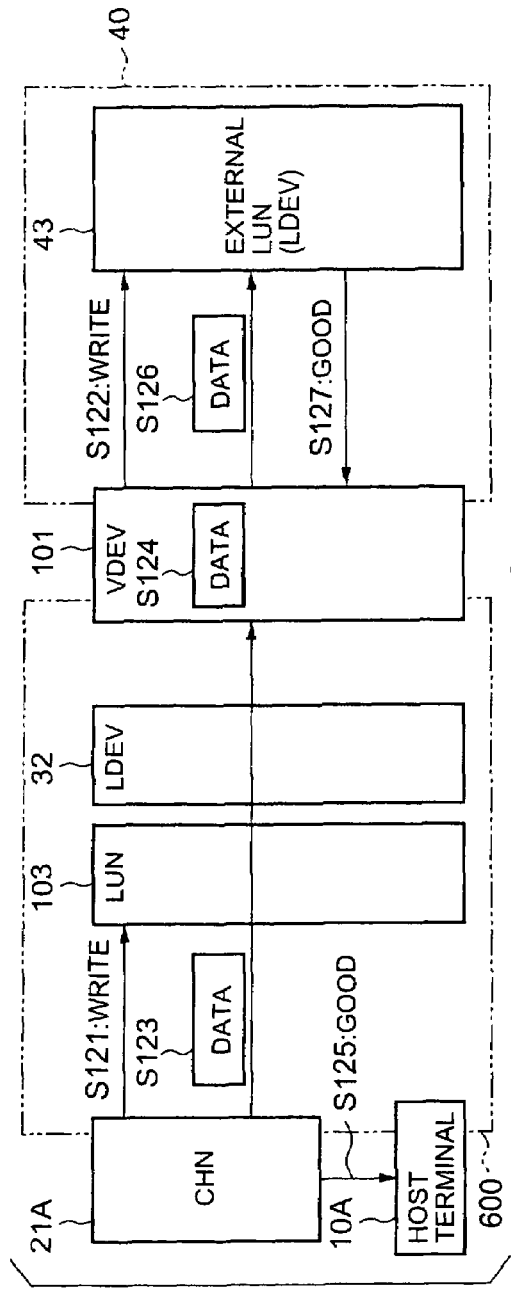
FIGS. 12(A) and 12(B) are a schematic diagram showing processing in the case of data writing.
Figure 12B:
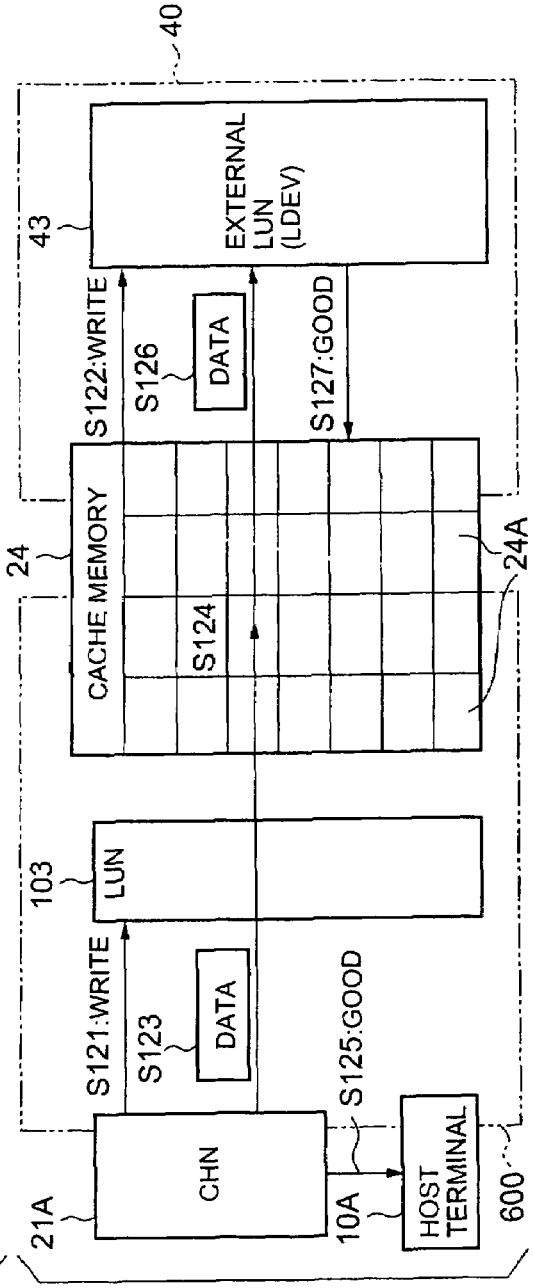
Figure 13:
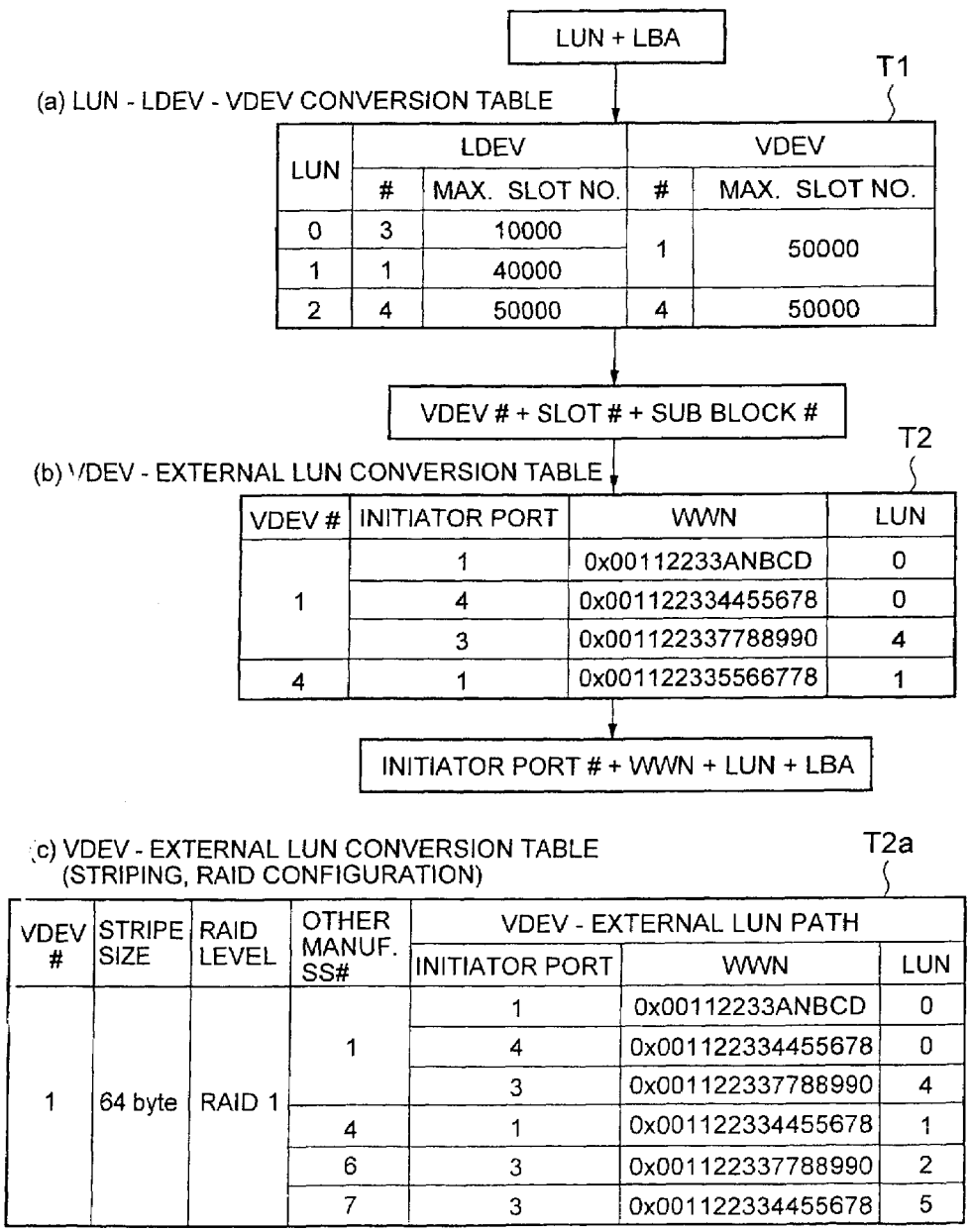
FIG. 13 is an illustrative diagram showing the sequence of processing in FIG. 12, in relation to the respective tables.

Data input and output between the first storage control system 600 and a second storage control system 40 is described with reference to FIG. 12 to FIG. 14. Firstly, a case where data is written will be described on the basis of FIG. 12 and FIG. 13. FIG. 12 is a schematic diagram showing processing in the case of data writing. FIG. 13 is an illustrative diagram showing the sequence of processing in FIG. 12, in relation to the respective tables.

The CHN 21A is able to block level data obtained by converting the file level data from the host device 10A, to an internal LDEV 31 or 32.

If the LDEV to which the CHN 21A wishes to write data is an internal LDEV 31, then data is written in accordance with standard processing. More specifically, the data from the CHN 21A is stored provisionally in the cache memory 24, and is then stored at a prescribed address on a prescribed disk storage device 400, from the cache memory 24 and via a DKA 22. In this case, the DKA 22 converts the logical address to a physical address. Moreover, in the case of a RAID composition, the same data is stored in a plurality of disk storage devices 400.

If, on the other hand, the LDEV to which the CHN 21A is seeking to write data is an internal LDEV 32 connected to an external LDEV 42 by means of a VDEV 102, then the data is written by means of a sequence such as that illustrated in FIG. 12. FIG. 12(*a*) is a flow diagram which is centered on illustrating the storage layers, and FIG. 12(*b*) is a flow diagram which is centered on illustrating the method in which the cache memory 24 is used.

The CHN 21A states the LDEV number identifying the write destination internal LDEV 32, and the WWN identifying the communications port 207A for accessing this internal LDEV 32, and issues a block unit I/O write command (Write) (S121). Upon receiving this I/O write command from the CHN 21A, the CHF 21B generates a block unit I/O write command for transmission to the second storage control system 40, and it then transmits same to the second storage control system 40 (S122). The CHF 21B then generates a new write command, by changing the write destination address information, and the like, contained in the I/O write command received from the CHN 21A, in order to concord with the external LDEV 42.

Thereupon, the CHN 21A sends the data to be written, to the CHF 21B (S123). The data received by the CHF 21B is transferred from the internal LDEV 32, via the VDEV 101 (S124), to the external LDEV 42 (S126). Here, the CHN 21A returns a writing completed response (Good) to the host device 10, at the time that the data from the host 10A has been stored in the cache memory 24(S125). At the time that it receives the data from the CHF 21B (or the time that it completes writes to the external LDEV 42,) the second storage control system 40 transmits a writing completed report to the CHF 21B (S127). More specifically, the timing at which the completion of writing is reported by the CHN 21A to the host device 10A (S125) is different to the timing at which the data is actually stored in the storage device 42 (asynchronous system). Therefore, the host device 10A is released from the data write processing before the data is actually stored in the external LDEV 42, and hence it can carry out other processing.

Referring now to FIG. 12(*b*), a plurality of sub-blocks 24A are provided in the cache memory 24. The first storage control system 600 stores data in a prescribed location of the cache memory 24 by converting the logical block address specified by the host device 10 to a sub-block address (S124).

The procedure of converting data by means of the various tables is now described with reference to FIG. 13. As illustrated in the upper part of FIG. 13, the CHN 21A transmits data by specifying a LUN and logical block address (LBA). The CHF 21B converts the data input for the internal LDEV 32 (LUN+LBA), into data for the VDEV 101, on the basis of the first conversion table T1 illustrated in FIG. 13(*a*). The first conversion table T1 is a LUN–LDEV–VDEV conversion table for converting data specifying an internal LUN 103 into data for a VDEV 101. This table T1 is stored in the SM 25, for example, (the same applies to the tables T2 and T2*a* described hereinafter). This table T1 is constituted by mutual associations between, for example, a LUN, the number of a LDEV 32 corresponding to that LUN 103 (LDEV #) and the maximum slot number thereof, and the number of a VDEV 101 corresponding to the LDEV 102 (VDEV#) and the maximum slot number thereof, and the like. Moreover, although not shown in the drawings, it is also possible for this table T1 also to register which LBA of which LDEV 32 corresponds to which sub-block or which slot of the cache memory 24, and the like. By referring to a table T1 of this kind, the CHF 21B (for example, the first CHF 21B) converts the data from the CHA 21A (LUN+LBA) into data for the VDEV 101 (VDEV#+SLOT#+SUBBLOCK #).

Thereupon, the CHF 21B refers to the second conversion table T2 illustrated in FIG. 13(*b*), and converts the data for the VDEV 101 into data for storing by transmission to an external LUN (external LDEV 42) in the second storage control system 40. The second conversion table T2 contains mutual associations between, for example, a VDEV 101 number (VDEV#), the numbers of the initiator ports for transmitting the data from the VDEV 101 to the second storage control system 40, the WWNs for identifying the communications ports 41 to which data is to be transferred, and the LUNs which can be accessed via those communications ports. On the basis of this second conversion table T2, the CHF 21B converts the destination information for the data to be stored, into the format of: initiator port number #+WWN+LUN+LBA. The data comprising changed destination information in this way is transmitted from the designated initiator port, via the communications network CN2, and arrives at the designated communications port 41. Thereupon, the data is stored in a prescribed location of the external LDEV 42 which can be accessed by means of the specified LUN 43. Since the external LDEV 42 is constructed in a virtual manner on a plurality of disk storage devices 401, the data address is converted to a physical address and the data is stored at a prescribed address on a prescribed disk.

FIG. 13(*c*) shows a further second conversion table T2*a*. This conversion table T2*a* is used in a case where striping or a RAID configuration is used in the VDEV 101 which originates in the external storage device 42. The conversion table T2*a* is constituted by mutual associations between a VDEV number (VDEV#), a stripe size, a RAID level, a number for identifying a second storage control system 40 (SS# (storage system number)), an initiator port number, a WWN of a communications port 41, and the number of a LUN 43. In the example shown in FIG. 13(*c*), one VDEV 101 constitutes RAID 1, by using a total of four external storage control systems identified by the SS# (1, 4, 6, 7). Moreover, the three LUN assigned to SS #1 (#0, #0, #4) are established for the same device (LDEV #). The volume of LUN #0 is provided with an alternative path structure having two access data paths. In this way, in the present embodiment, it is possible to provide additional functions, such as striping or a RAID configuration, or the like, to the CHN 21A, by constituting a VDEV 101 from a plurality of logical volumes (LDEVs) located externally.

The sequence of processing in a case where data is read from an external LDEV 42 in the second storage control system 40 is now described with reference to FIG. 14.

Firstly, the CHN 21A transmits a block unit I/O read command to the CHF 21B (S131). Upon receiving the I/O read command, the CHF 21B generates a separate block unit I/O read command, in order that the required data is read out from the second storage control system 40. The CHF 21B transmits the separately generated I/O read command to the second storage control system 40 (S132). In response to the separate I/O read command received from the CHF 21B, the second storage control system 40 reads out the required data from the external LDEV 42, transmits this data to the CHF 21B (S133), and reports that read out has been completed normally (S135). As shown in FIG. 14(*b*), the CHF 21B stores the data received from the second storage control system 40, at a prescribed location in the cache memory 24 (S134).

The CHF 21B reads out the data stored in the cache memory 24, and after performing address conversion, it transmits the data to the CHN 21A, via the LUN 103, and the like (S136). The CHN 21A issues a read out completion report (S137). In this sequence of processing for reading out data, the conversion operation described with respect to FIG. 13 is carried out in the reverse direction.

FIG. 14 shows a case where data is read out from the second storage control system 40 in response to a request from the CHN 21A, and this data is stored in the cache memory 24. However, the sequence is not limited to this, and it is also possible for all or a portion of the data stored in the external LDEV 42 to be stored previously in the cache memory 24. In this case, the data can be read out immediately from the cache memory and transmitted to the CHN 21A, in response to a read out command from the CHN 21A.

According to the present embodiment described above, an I/O allocation control data 820 is prepared which contains address information corresponding to the file name contained in the file I/O data received from the host device 10A (in other words, the address information contained in the block I/O data converted from the file I/O data), and information indicating whether this address information corresponds to an internal location or an external location. The NAS processor 806 or the input/output processor 804 of the CHN 21A refers to this I/O allocation control data 820 and judges whether the address information corresponding to the file name contained in the file I/O data received from the host device 10A relates to an internal or an external location, and the transfer destination of the block I/O data is assigned to be either a DKA 22 in the first storage control system 600, or the CHF 21B, on the basis of this judgment result. If the CHF 21B is assigned, then the block I/O command is transferred by the CHF 21B to the second storage control system 40. Consequently, the host device 10A is able to access a storage region in a storage control system selected from a plurality of storage control systems, even if it outputs a file I/O command, without recognizing whether the access destination is an internal LDEV 31 of the first storage control system 600 or an external LDEV 42 of a second storage control system 40. In other words, the first storage control system 600 and the second storage control systems 40 are connected and used as a single storage control system by the host devices 10A, 10B.

In the present embodiment described above, if the CHA 21C has receives a block I/O command from the host device 10B, via the SAN CN3, then the input/output processor of the CHA 21C may refer to the I/O allocation control data 820, judge whether the address information contained in the received block I/O data corresponds to an internal or an external location, and assign the transfer destination for that block I/O data to be a DKA 22 in the first storage control system 600, or the CHF 21B, depending on the judgment result.

A number of modification examples can be conceived with respect to the embodiment described above. The following descriptions will centre principally on the points of difference between these respective modification examples and the present embodiment.

(1) FIRST MODIFICATION EXAMPLE

Figure 15:
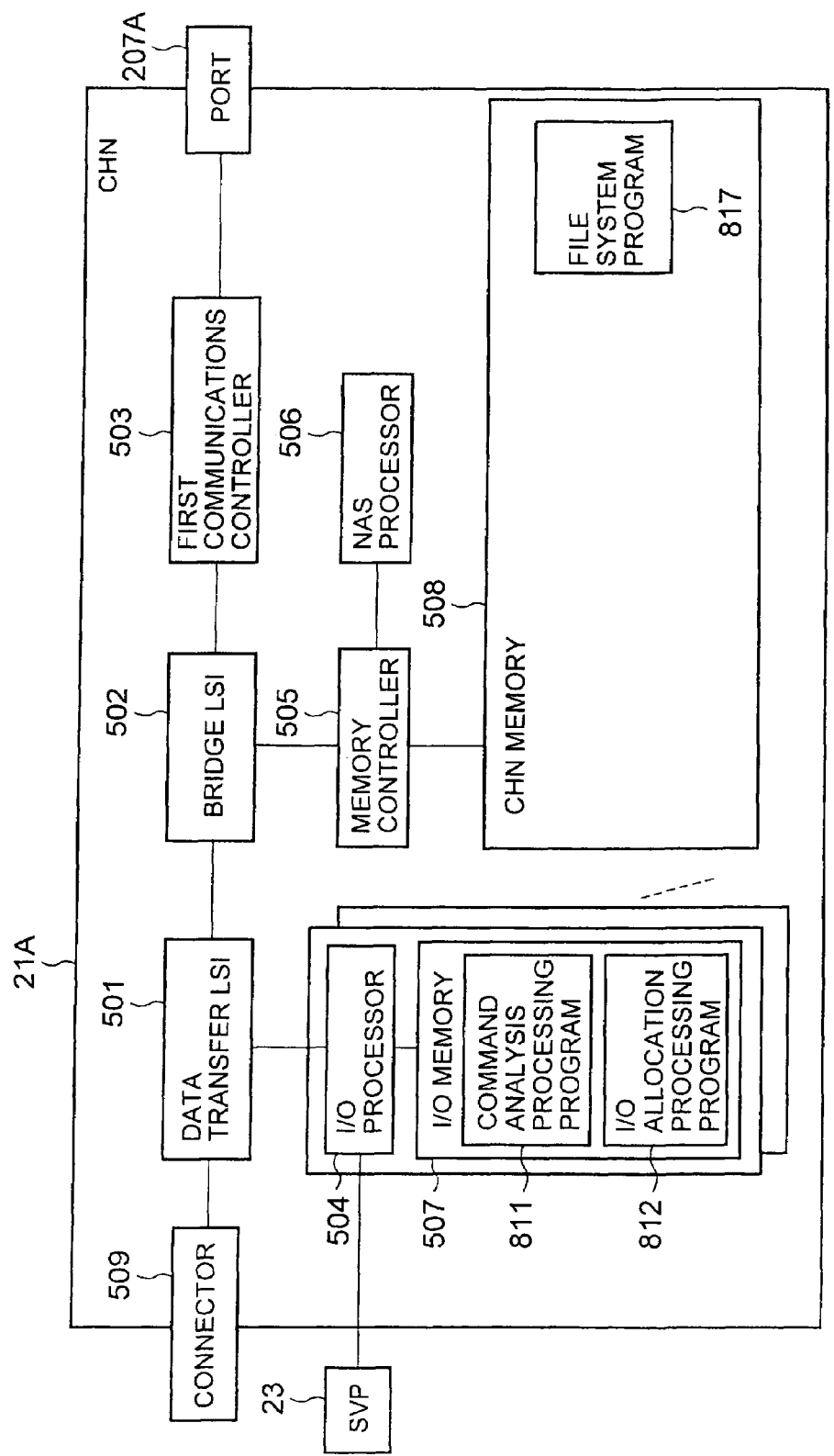
FIG. 15 shows an example of the composition of a CHN 21A relating to a first modification example of the present embodiment.

FIG. 15 shows an example of the composition of a CHN 21A relating to a first modification example of the present embodiment.

As shown in the diagram, in the first modification example of the present embodiment, a command analysis processing program 811 and an I/O allocation processing program 812 are stored in the I/O memory 507.

Figure 16:
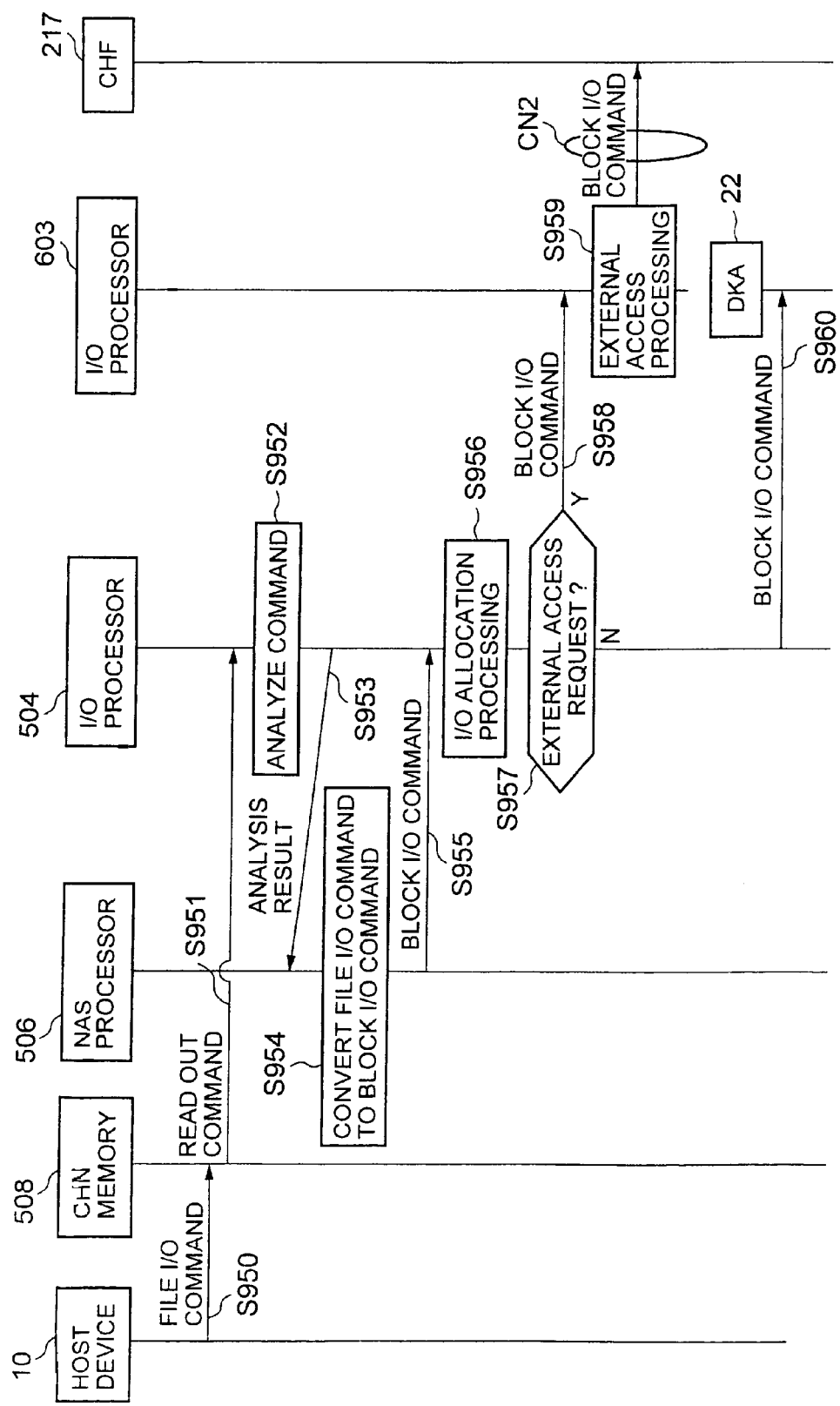
FIG. 16 shows one example of a processing sequence relating to the first modification example of the present embodiment.

FIG. 16 shows one example of a processing sequence relating to the first modification example of the present embodiment.

The file I/O command output by the host device 10A is received by the CHN 21A and stored in the CHN memory 508 (S950).

The NAS processor 506 outputs an instruction for reading out the file I/O command stored in the CHN memory 508, to the I/O processor 504, and the I/O processor 504 reads out the file I/O command, from the CHN memory 508, in response to this instruction (S951). The I/O processor 504 then performs analysis, in accordance with the file analysis processing program 811, to determine whether the file I/O command is a file write command or a file read command (S952), and it reports the analysis result to the NAS processor 506 (S953).

On the basis of the analysis result thus reported, the NAS processor 506, in accordance with the file system program 817, converts the file I/O command to a block I/O command (S954) and transmits that block I/O command to the I/O processor 504 (S955).

The I/O processor 504 performs the I/O allocation processing described previously, on the basis of the address information contained in the converted block I/O command, and the I/O allocation control data 820 (S956).

As a result of the I/O allocation processing in S956, if external access request processing is to be carried out (Y at S957), then the I/O processor 504 outputs the block I/O command, to the I/O processor 504 of the CHF 21B (S958). In this case, the I/O processor 603 of the CHF 21A carries out the external access processing described above (S959).

As a result of the I/O allocation processing in S956, if internal access request processing is to be carried out (N at S957), then the I/O processor 504 outputs the block I/O command, to a DKA 22, via the connecting section 26 (S960).

If, as a result of the I/O allocation processing at S956, both external access request processing and internal access request processing are to be carried out, then the I/O processor 504 carries out both S958 and S960.

(2) SECOND MODIFICATION EXAMPLE

Figure 17:
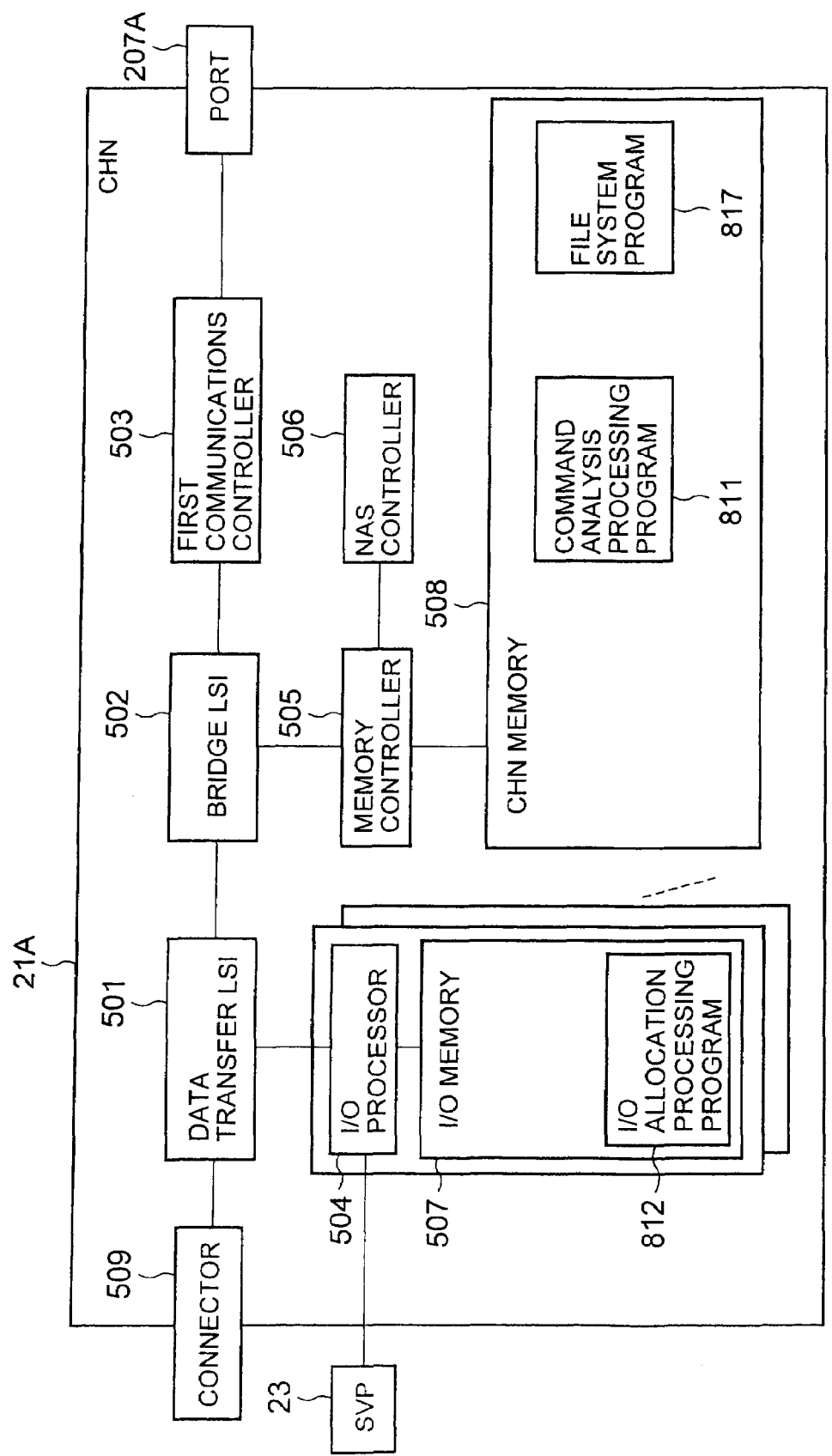
FIG. 17 shows an example of the composition of a CHN 21A relating to a second modification example of the present embodiment.

FIG. 17 shows an example of the composition of a CHN 21A relating to a second modification example of the present embodiment.

As shown in the diagram, in the second modification example of the present embodiment, a command analysis processing program 811 is stored in the CHN memory 508 and an I/O allocation processing program 812 is stored in the I/O memory 507.

Figure 18:
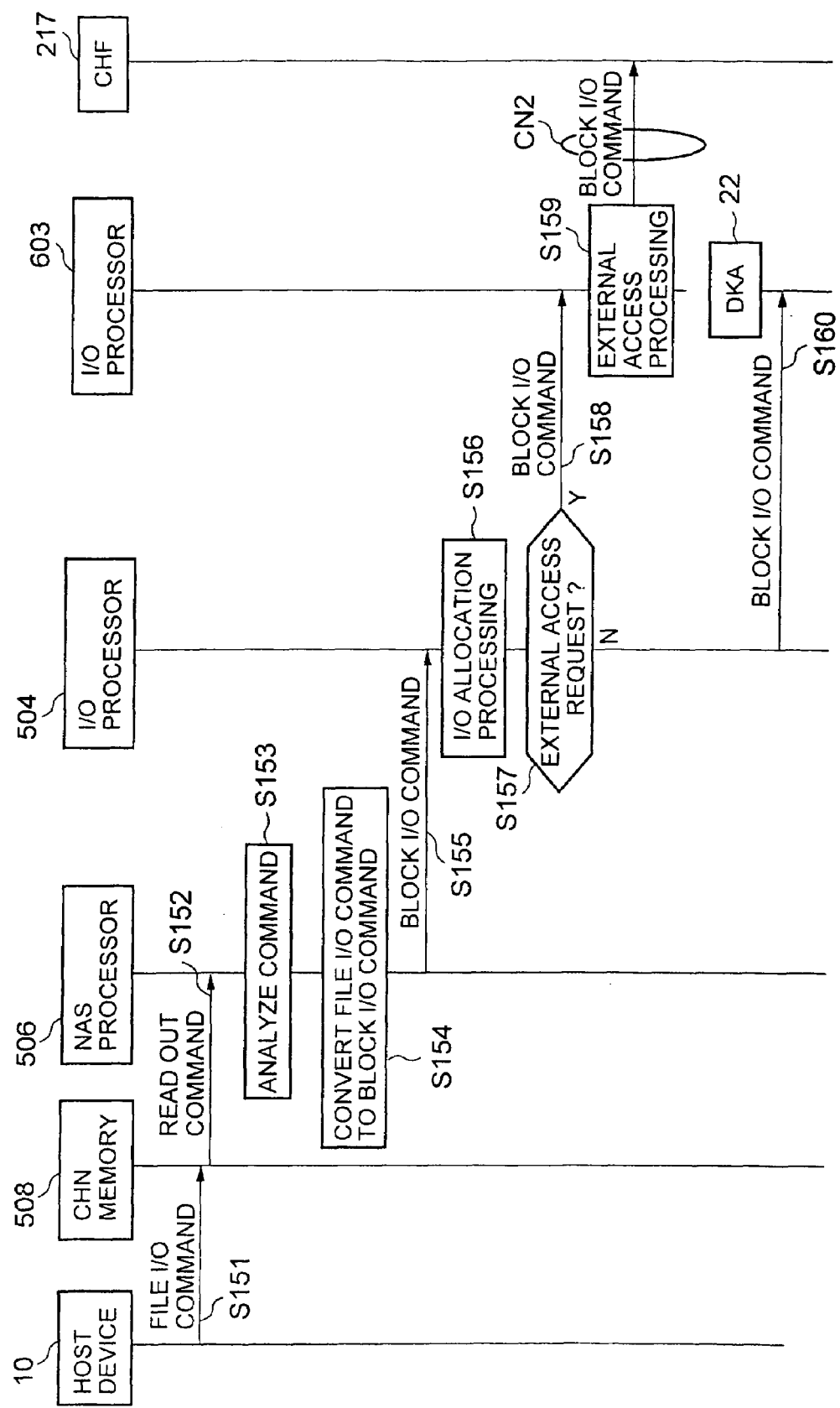
FIG. 18 shows one example of a processing sequence relating to the second modification example of the present embodiment.

FIG. 18 shows one example of a processing sequence relating to the second modification example of the present embodiment.

The file I/O command output by the host device 10A is received by the CHN 21A and stored in the CHN memory 508 (S151).

The NAS processor 506 reads out the file I/O command stored in the CHN memory 508 (S152), and carries out command analysis processing in accordance with the file analysis processing program 811 (S153). The NAS processor 506 then converts that file I/O command to a block I/O command (S154), and transmits the block I/O command to the I/O processor 504 (S155).

The I/O processor 504 performs the I/O allocation processing described previously, on the basis of the address information contained in the converted block I/O command, and the I/O allocation control data 820 (S956).

The subsequent processing is the same as that in S957 to S960 in FIG. 16 (S157-S160).

(3) THIRD MODIFICATION EXAMPLE

Figure 19:
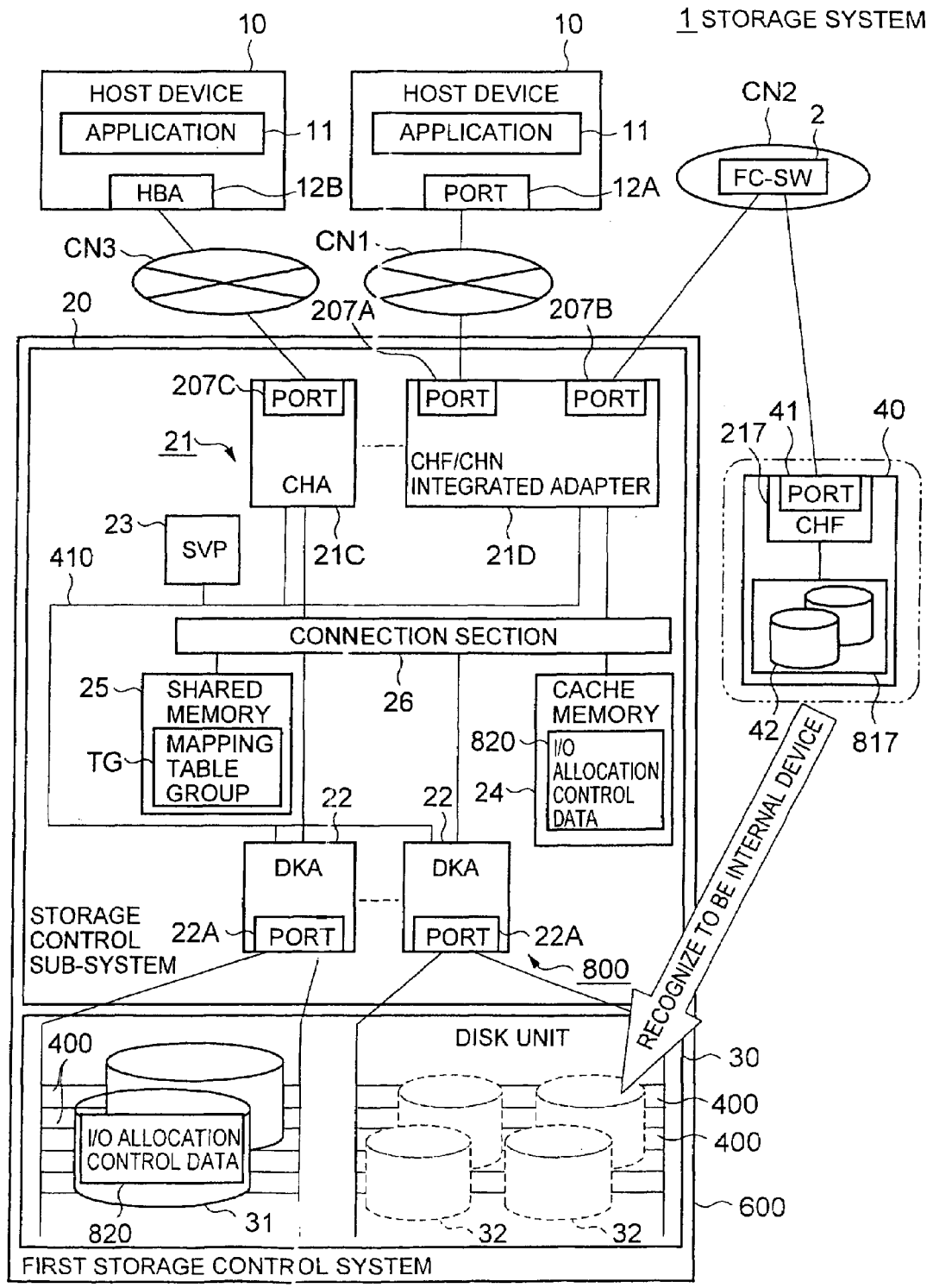
FIG. 19 is a block diagram showing the composition of a storage system relating to a third modification of the present embodiment.

FIG. 19 is a block diagram showing the composition of a storage system relating to a third modification of the present embodiment.

As this diagram illustrates, it is possible to install an integrated CHF/CHN adapter 21D which comprises an integrated CHN 21A and CHF 21B, in the first storage control system 600.

Figure 20:
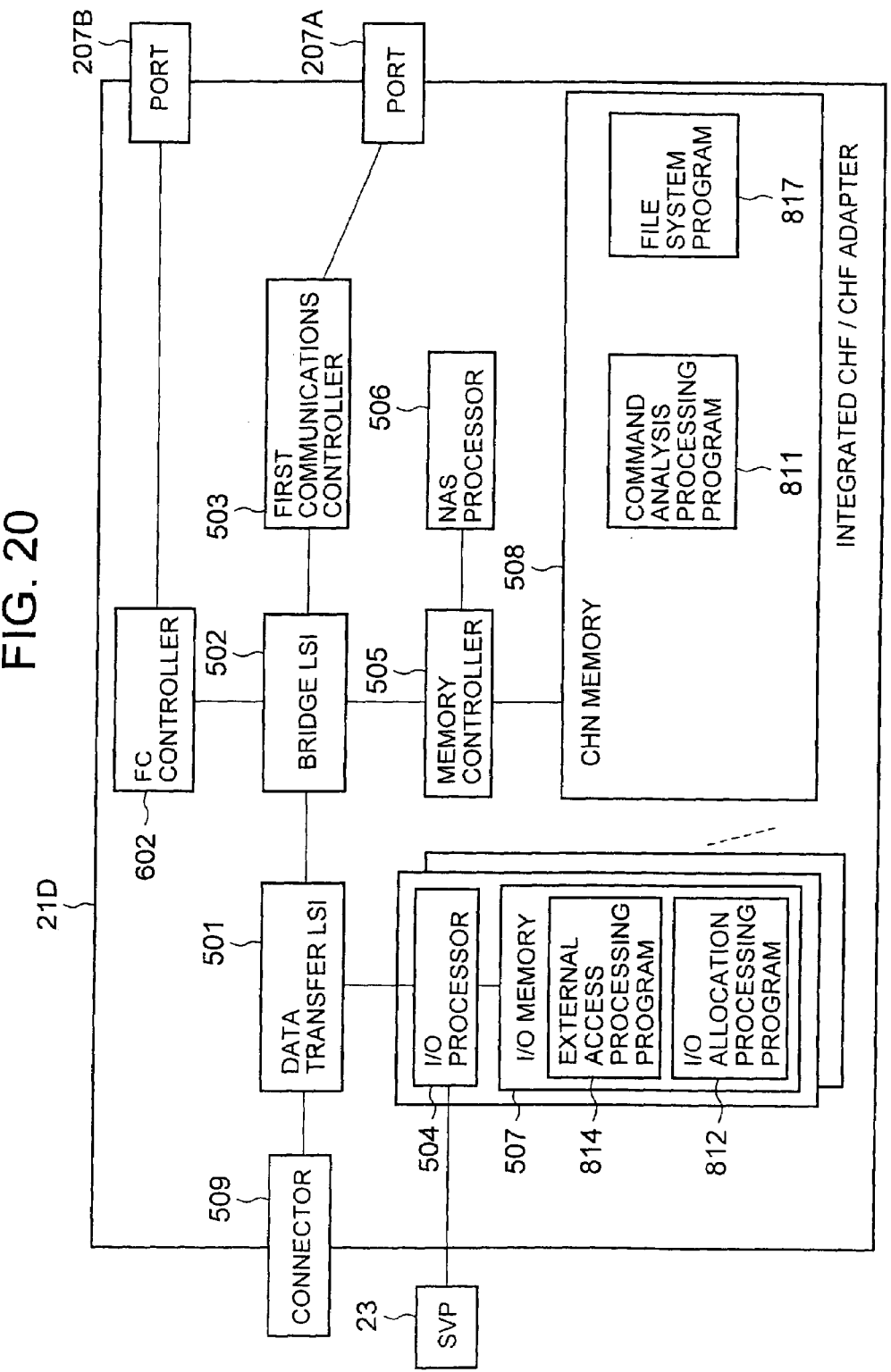
FIG. 20 shows an example of the composition of the integrated CHF/CHN adapter 21D.

FIG. 20 shows an example of the composition of the integrated CHF/CHN adapter 21D.

The integrated CHF/CHN adapter 21D comprises a communications port 207B and an FC controller 602, in addition to the constituent elements of the CHN 21A illustrated in FIG. 5. The FC controller 602 is connected to a bridge LSI 504 and a communications port 207B.

Furthermore, an external access processing program 814 as described with respect to FIG. 6 is stored in the I/O memory 507 o the integrated CHF/CHN adapter 21D.

In the example illustrated, the I/O allocation processing program 812 is stored in the I/O memory 507, and the command analysis processing program 811 is stored in the CHN memory 508, but it is possible for these programs 811, 821 to be stored in either of the memories 507, 508.

(4) FOURTH MODIFICATION EXAMPLE

Figure 21:
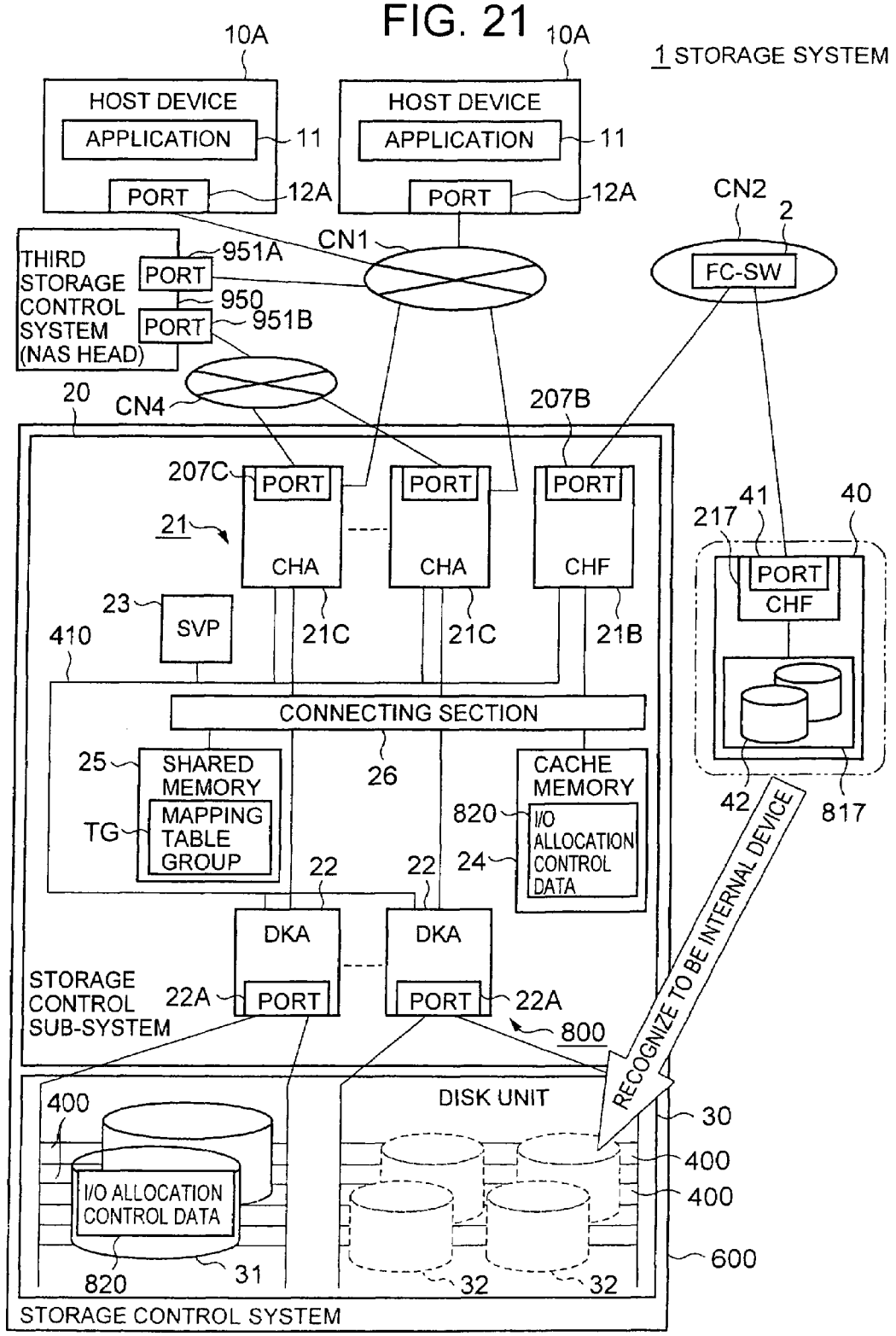
FIG. 21 is a block diagram showing the composition of a storage system relating to a fourth modification of the present embodiment.

FIG. 21 is a block diagram showing the composition of a storage system relating to a fourth modification of the present embodiment.

As shown in this diagram, each of a plurality of CHA 21C fitted in the first storage control system 600 instead of providing a CHN 21A in the first storage control system 600, are connected with a third storage control system (for example, a NAS head, and referred to as a "NAS head" hereinafter) 950, via a fourth communications network (for example, a SAN) CN4, which is located externally to the first storage control system 600. A communications port 951A connected to the LAN CN1 and a communications ports 951B connected to the SAN CN4 are provided in the NAS head 950.

Figure 22:
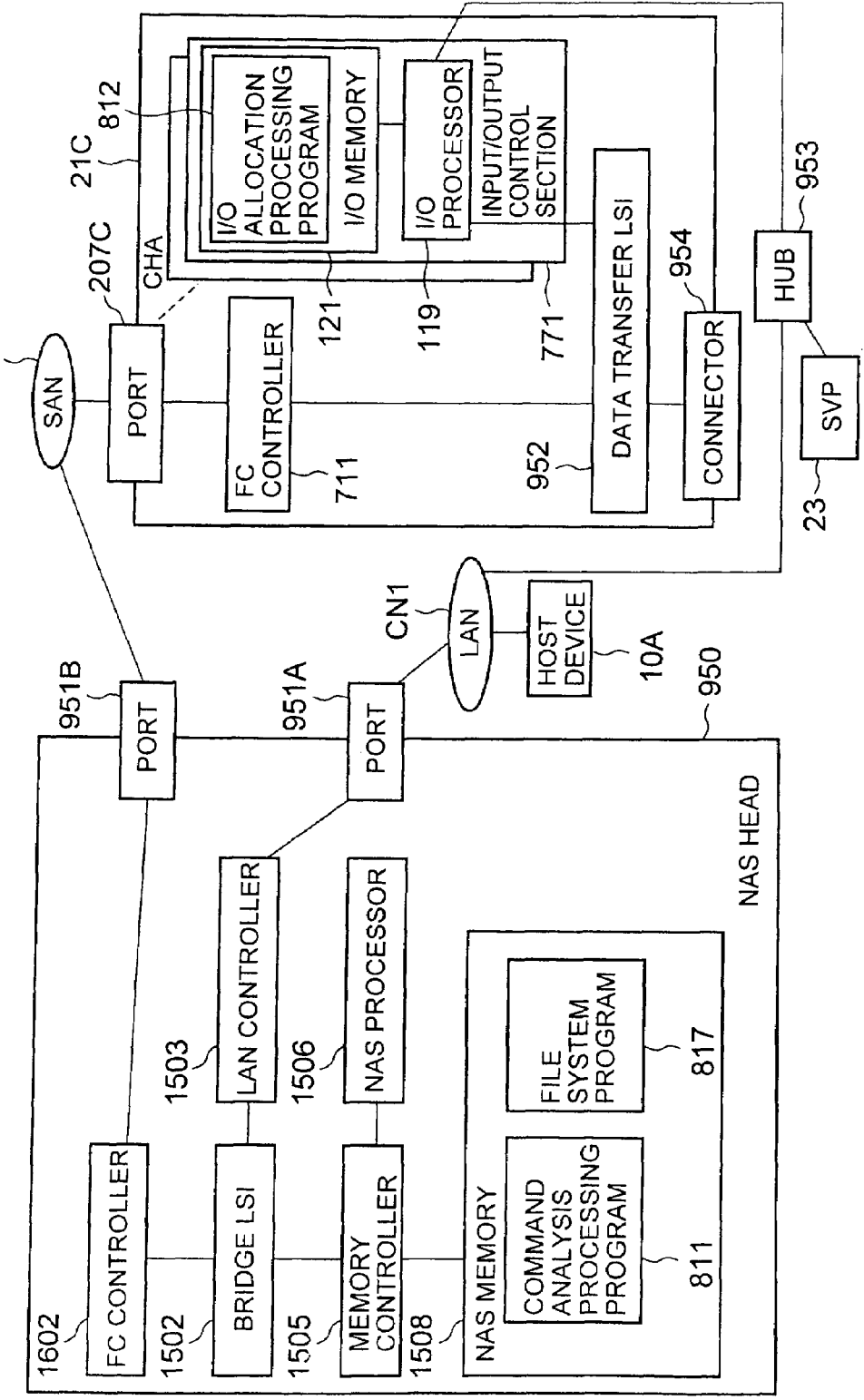
FIG. 22 shows an example of the composition of a NAS head 950 and a CHA 21C.

FIG. 22 shows an example of the composition of a NAS head 950 and a CHA 21C.

The NAS head 950 comprises a LAN controller 1503 connected to a communications port 951A, a bridge LSI 1502 connected to the LAN controller 1503, a NAS memory 1508, a NAS processor 1506, a memory controller 1505 connected to the NAS memory 1508 and the NAS processor 1506, and an FC controller 1602 connected to the bridge LSI 1502 and the communications port 951B. Where a respective constituent element has the same name as a constituent element of the CHN 21A (see FIG. 5) or the CHF 21B (see FIG. 6), that element has a similar function to same. The NAS memory 1508 has a similar function to the CHN memory 508.

The CHA 21C comprises an FC controller 711 connected to the SAN CN4 via a communications port 207C, one or a plurality of input/output control sections 771 having an I/O processor 119 and an I/O memory 121, a data transfer LSI 952 connected to the FC controller 711 and the I/O processor 119, and a connector 954 connected to the connecting section 26 and the data transfer LSI 952 in the first storage control system 600. Where a respective constituent element has the same name as a constituent element of the CHN 21A (see FIG. 5) or the CHF 21B (see FIG. 6), that element has a similar function to same.

A hub 953 is provided in the first storage control system 600. The I/O processor 119 is connected via the hub 953 to the LAN CN 1 and the SVP 23.

In the example illustrated, the I/O allocation processing program 812 is stored in the I/O memory 121, and the command analysis processing program 811 is stored in the NAS memory 1508, but it is possible for these programs 811, 812 to be stored in either of the memories 121, 1508.

As the foregoing description reveals, in this fourth modification example, the NAS processor 506 of the CHN 21A is installed on a NAS head 950 located externally to the first storage control system 600, as a NAS processor 1506. Therefore, provided that similar communications to the communications carried out between the NAS processor 506 and the I/O processor 504 are conducted between this NAS processor 1506 and the I/O processor 119 installed in the CHA 21C, then it is possible to achieve similar results to those of the embodiment and the first and second modification examples described above. Below, an example is described.

Figure 23A:
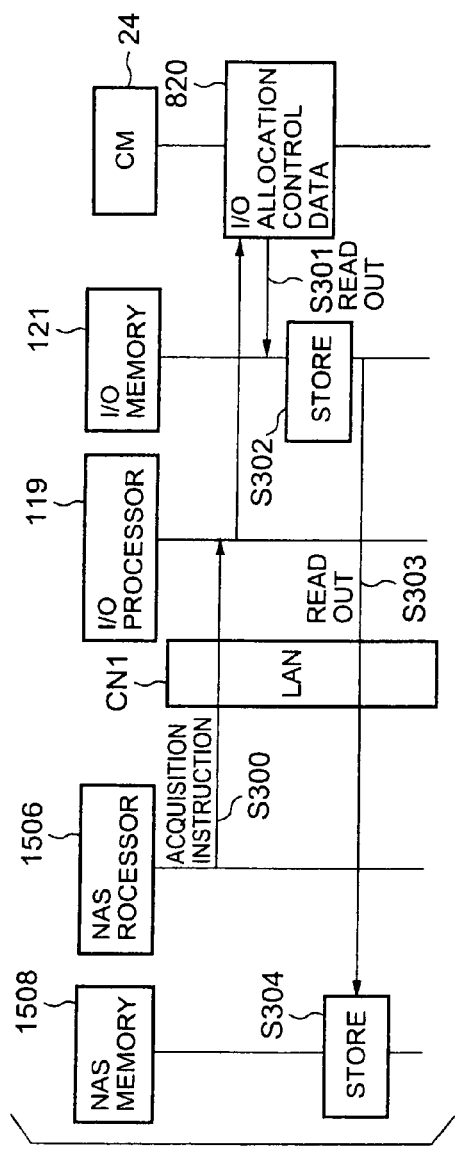
FIGS. 23(A) and 23(B) show a processing sequence according to the fourth modification example of the present embodiment, in a case where a I/O allocation control data 820 is exchanged.
Figure 23B:
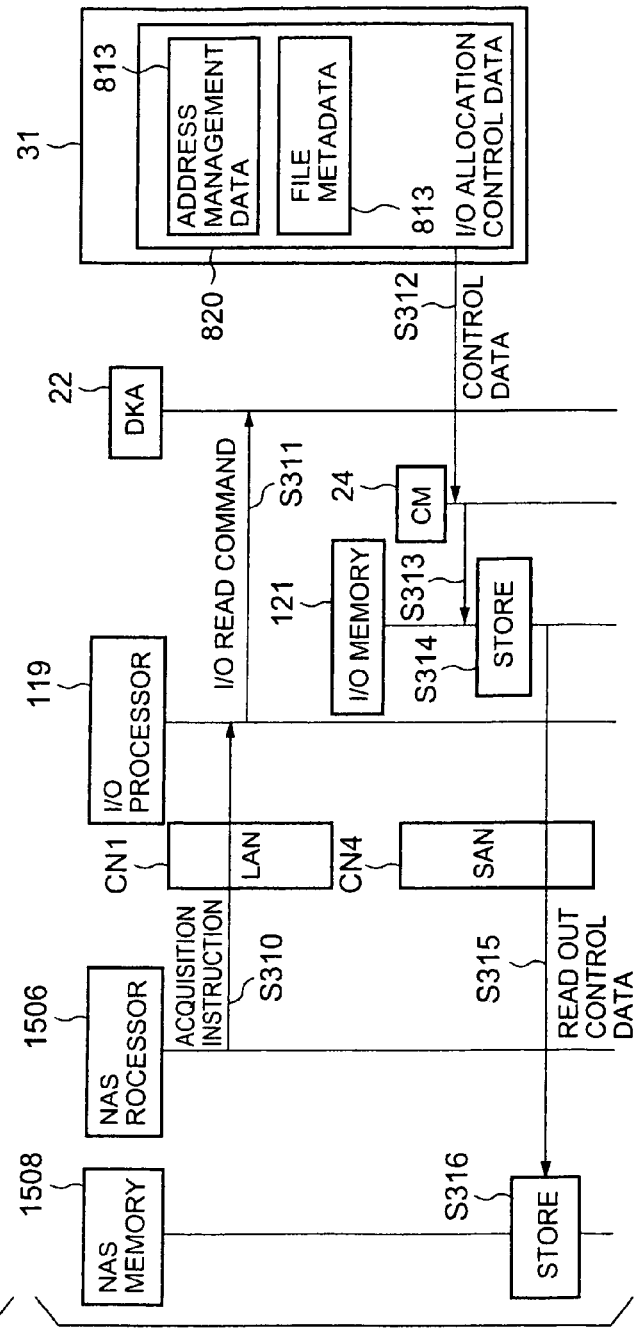

FIG. 23 shows a processing sequence according to the fourth modification example of the present embodiment, in a case where I/O allocation control data 820 is exchanged.

For example, as shown in FIG. 23(A), the NAS processor 1506 of the NAS head 950 outputs an instruction for the acquisition of the I/O allocation control data 820, to the I/O processor 119 of the CHA 21C, via the LAN CN1 (S300).

In response to this instruction, the I/O processor 119 of the CHA 21C reads out the I/O allocation control data 820 stored in the CM 24, and stores same in the I/O memory 121 (S301, S302). The I/O processor 119 of the CHA 21C transfers the I/O allocation control data 820 in the I/O memory 121, via the LAN CN1, to the NAS head 950 (S303). Thereby, the I/O allocation control data 820 is stored in the NAS memory 1508 of the NAS head 950 (S304).

Furthermore, for example, as shown in FIG. 7(B), the NAS processor 1506 of the NAS head 950 outputs an instruction for the acquisition of the I/O allocation control data 820, to the I/O processor 119 of the CHA 21C, via the LAN CN1 (S310).

In response to this instruction, the I/O processor 119 outputs an I/O read command for reading out the I/O allocation control data 820, to a DKA 22 which is able to access the internal LDEV 31 in which the I/O allocation control data 820 is stored (S311).

The DKA 22 receiving the I/O read command reserves a cache region on the CM 24, acquires the I/O allocation control data 820 from the internal LDEV 31 storing the I/O allocation control data 820, and stores it in the cache region (S312).

The I/O processor 119 reads out the I/O allocation control data 820, from the reserved cache region, to the I/O memory 121 (S313). Thereby, the I/O allocation control data 820 is stored in the I/O memory 121 (S314).

The I/O processor 119 then transfers the I/O allocation control data 820 in the I/O memory 121 to the NAS head 950, via the SAN CN4, as read object data read out in response to the acquisition instruction in S310 (S315). Thereby, the I/O allocation control data 820 is stored in the NAS memory 1508 of the NAS head 950 (S316).

FIG. 24 shows an example of a processing sequence according to the fourth modification example of the present embodiment, carried out in a case there a file I/O command output by the host device 10A is transferred as a block I/O command.

A file I/O command output from the host device 10A is received by the NAS head 950, via the LAN CN1, and stored in the NAS memory 1508 (S451).

The NAS processor 1506 reads out the file I/O command stored in the NAS memory 1508 (S452), and carries out command analysis processing in accordance with the file analysis processing program 811(S453). The NAS processor 1506 converts this file I/O command to a block I/O command (S454), and transmits this block I/O command to the I/O processor 119 of the CHA 21C, via the SAN CN4 (S455).

The I/O processor 119 carries out the I/O allocation processing described above, on the basis of the address information contained in the block I/O command thus received, and the I/O allocation control data 820 (S456).

The subsequent processing is the same as that in S957 to S960 in FIG. 16 (S457-S460).

The foregoing description related to the exchange between the NAS processor 1506 of the NAS head 950 and the I/O processor 119 of the CHA 21C, taking an example wherein the I/O allocation processing program 812 is stored in the I/O memory 121 and the command analysis processing program 811 is stored in the NAS memory 1508. However, as described above, provided that similar communications to the communications carried out between the NAS processor 506 and the I/O processor 504 are conducted between the NAS processor 1506 and the I/O processor 119, then it is possible to achieve similar results to those of the embodiment and the first and second modification examples described above. In other words, if, in FIG. 7, FIG. 8, FIG. 10, FIG. 16 and FIG. 18, the CHN memory 508 were substituted with a NAS memory 1508, the NAS processor 506 were substituted with a NAS processor 1506, and the I/O processor 504 were substituted with an I/O processor 119, then it would be possible to achieve similar results to those of the embodiment and the first and second modification examples described above, in the fourth modification example. Moreover, in FIG. 12 and FIG. 14, it is also possible to substitute the CHN 21A with the CHA 21C.

Above, an embodiment and modifications of the present invention were described, but these are simply examples for the purpose of describing the present invention and the scope of the present invention is not limited to this embodiment and these modifications alone. The present invention may be implemented in various further modes. For example, in the embodiment and respective modification examples described above, the communications between the first storage control system 600 and the second storage control system 40 may also be carried out in accordance with an iSCSI protocol. In this case, for example, instead of the CHF in the first storage control system 600 and the second storage control system 40, it is possible to provide channel adapter iSCSI devices having communications ports assigned with iSCSI names (unique ID in iSCSI protocol). Moreover, in this case, for example, in the embodiment and respective modification examples described above, it is also possible to exchange iSCSI names between the first storage control system 600 and the second storage control system 40, instead of WWN.

What is claimed is:

1. A storage control system for controlling storage of data in storage devices, comprising:
a plurality of storage devices for storing data;
a storage device control section for controlling the storage of received data in said plurality of storage devices;
a connecting section connected to said storage device control section;
a first channel control section connected to at least one of a local area network and a storage area network located externally to said storage control system, and to said connecting section;
a second channel control section for transferring data, sent from said first channel control section via said connecting section, to an external storage control system, via at least one of said local area network and said storage area network, or a separate network;
a shared memory wherein first control information exchanged by said first channel control section, said second channel control section, and said storage device control section, is stored; and
a cache memory for temporarily saving data exchanged between said first channel control section or said second channel control section and said storage device control section;
wherein said first channel control section comprises a second processor for receiving block level data from a first processor which converts file level data received via said local area network into said block level data, wherein at least one of said first processor and said second processor judges whether all or a portion of said block level data is to be stored in either said storage control system or said external storage control system based on metadata relating to files managed by said first processor, wherein said second processor transfers said block level data received from said first processor, to at least one of said storage device control section and said second channel control section, based on a result of said judgment, wherein said metadata contains file identification information and save destination address information corresponding to a plurality of files and said first processor identifies save destination address information corresponding to file identification information contained in received file level data from said metadata.

2. The storage control system according to claim 1, wherein said first processor receives said file level data from a host computer, via at least one of said local area network and said storage area network, and wherein said second processor transfers a portion of said block level data based on the file level data received from said host computer, to said second channel control section, so as to be stored in an external storage region belonging to said external storage control system, based on a result of said judgment, and transfers the remaining portion of said block level data to said storage device control section, so as to be stored in an internal storage region belonging to said plurality of storage devices.

3. The storage control system according to claim 1, wherein said first channel control section sets a storage region combining the external storage region belonging to said external storage control system and an internal storage region belonging to said storage control system, as a logical unit, to be an access object of the host computer transmitting said file level data.

4. The storage control system according to claim 1, further comprising:

a metadata storage region in which said metadata is stored, wherein said first processor is provided in said first channel control section; and at least one of said first processor and said second processor judges whether all or a portion of said block level data is to be stored in either said storage control system or said external storage control system, based on said metadata stored in said metadata storage region.

5. The storage control system according to claim 1, wherein a plurality of address information elements, and information indicating which of either said storage control system or said external storage control system each of said plurality of address information elements corresponds to, are recorded in said metadata; and at least one of said first processor and said second processor refers to said metadata and judges which of either said storage control system or said external storage control system the address information contained in said block level data corresponds to.

6. The storage control system according to claim 1, further comprising:

a virtual intermediate storage device provided between the internal storage region belonging to said storage control system and said storage devices, wherein said virtual intermediate storage device associates said internal storage region with said external storage region belonging to said external storage control system.

7. A storage control method for controlling storage of data in a plurality of storage devices, comprising:

a step in which a first processor converts file level data, received via a local area network, into block level data;

a step in which at least one of said first processor and a second processor belonging to a first channel control section connected to a communications network external to a storage control system judges whether all or a portion of said block level data is to be stored in either said storage control system or an external storage control system based on metadata relating to files managed by said first processor;

a step in which said second processor transfers said block level data received from said first processor to at least one of a storage device control section controlling the storage of data in the plurality of storage devices provided by said storage control system and a second channel control section connected to the external storage control system via a storage network;

a step in which said storage device control section stores said block level data in at least one of said plurality of storage devices, if said block level data is received from said second processor; and a step in which, if said block level data is received from said second processor, said second channel control section transfers said received block level data to said external storage control system, wherein said metadata contains file identification information and save destination address information corresponding to a plurality of files and said first processor identifies save destination address information corresponding to file identification information contained in received file level data from said metadata.

8. The method according to claim 7, further comprising:

a step in which said first processor receives said file level data from a host computer via said external local area network; and in the step in which said second processor performs said transfer, said second processor transfers a portion of said block level data based on the file level data received from said host computer, to said second channel control section, so as to be stored in an external storage region belonging to said external storage control system, bases on a result of said judgment, and transfers the remaining portion of said block level data to said storage device control section so as to be stored in an internal storage region belonging to said plurality of storage devices.

9. The method according to claim 7, further comprising:

a step in which said first channel control section sets a storage region combining the external storage region belonging to said external storage control system and an internal storage region belonging to said storage control system, as a logical unit, to be an access object of the host computer transmitting said file level data.

10. The method according to claim 7, further comprising:

a step in which said metadata is stored in a metadata storage region, wherein said first processor is provided in said first channel control section; and in said judging step, at least one of said first processor and said second processor judges whether all or a portion of said block level data is to be stored in either said storage control system or said external storage control system based on said metadata stored in said metadata storage region.

11. The method according to claim 7, wherein a plurality of address information elements, and information indicating which of either said storage control system or said external storage control system each of said plurality of address information elements corresponds to, are recorded in said metadata; and in said judging step, at least one of said first processor and said second processor refers to said metadata and judges which of either said storage control system or said external storage control system the address information contained in said block level data corresponds to.

12. The method according to claim 7, further comprising:
a step in which the internal storage region belonging to said storage control system is associated with the external storage region belonging to said external storage control system, via a virtual intermediate storage device provided between said internal storage region and said storage devices.

* * * * *